(12) United States Patent
Toyoizumi et al.

(10) Patent No.: US 11,169,458 B2
(45) Date of Patent: Nov. 9, 2021

(54) TONER

(71) Applicant: CANON KABUSHIKI KAISHA, Tokyo (JP)

(72) Inventors: Noritaka Toyoizumi, Mishima (JP); Takashi Kenmoku, Mishima (JP); Yuzo Seino, Gotemba (JP); Kenta Kamikura, Yokohama (JP); Yu Yoshida, Mishima (JP); Akane Masumoto, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/935,268

(22) Filed: Jul. 22, 2020

(65) Prior Publication Data

US 2021/0026266 A1    Jan. 28, 2021

(30) Foreign Application Priority Data

Jul. 25, 2019 (JP) .............................. JP2019-137209

(51) Int. Cl.
| | | |
|---|---|---|
| *G03G 9/08* | (2006.01) | |
| *G03G 9/093* | (2006.01) | |
| *G01N 23/20* | (2018.01) | |

(52) U.S. Cl.
CPC ..... *G03G 9/0827* (2013.01); *G01N 23/20083* (2013.01); *G03G 9/09328* (2013.01);
(Continued)

(58) Field of Classification Search
CPC . G03G 9/093; G03G 9/09307; G03G 9/09314
See application file for complete search history.

(56) References Cited

U.S. PATENT DOCUMENTS

| 6,777,153 B2 | 8/2004 | Yano et al. |
|---|---|---|
| 6,808,907 B2 | 10/2004 | Honma et al. |

(Continued)

FOREIGN PATENT DOCUMENTS

| JP | 2003-107785 | 4/2003 |
|---|---|---|
| JP | 2004-325756 | 11/2004 |

(Continued)

OTHER PUBLICATIONS

Translation of JP 2008-052021.*

(Continued)

*Primary Examiner* — Peter L Vajda
(74) *Attorney, Agent, or Firm* — Venable LLP

(57) ABSTRACT

A toner including a toner particle, wherein the toner particle includes a toner base particle containing a binder resin, and a shell on the surface of the toner base particle; the shell contains a metal compound and an organosilicon polymer; the shell has at least an exposed portion of the metal compound and an exposed portion of the organosilicon polymer, on the surface of the toner particle; and in an analysis of a cross section of the toner particle by TEM-EDX, Ha (nm) and Hb (nm) which are average distances from the interface of the toner base particle and the shell up to the toner particle surface at the exposed portion of the metal compound and at the exposed portion of the organosilicon polymer, respectively, on the toner particle surface, satisfy Expression (1) below:

$$Hb > Ha + 20.0 \qquad (1).$$

12 Claims, 2 Drawing Sheets

(52) U.S. Cl.
CPC ..... *G03G 9/09342* (2013.01); *G03G 9/09364* (2013.01); *G03G 9/09371* (2013.01); *G01N 2223/076* (2013.01)

(56) References Cited

U.S. PATENT DOCUMENTS

| | | | |
|---|---|---|---|
| 6,908,721 B2 | 6/2005 | Kenmoku et al. |
| 6,911,520 B2 | 6/2005 | Fukui et al. |
| 7,045,321 B2 | 5/2006 | Imamura et al. |
| 7,393,912 B2 | 7/2008 | Mihara et al. |
| 7,399,568 B2 | 7/2008 | Fukui et al. |
| 7,408,017 B2 | 8/2008 | Imamura et al. |
| 7,452,960 B2 | 11/2008 | Yano et al. |
| 7,510,813 B2 | 3/2009 | Yano et al. |
| 7,638,194 B2 | 12/2009 | Fukui et al. |
| 7,638,590 B2 | 12/2009 | Fukui et al. |
| 7,682,765 B2 | 3/2010 | Sugawa et al. |
| 7,795,363 B2 | 9/2010 | Fukui et al. |
| 7,935,771 B2 | 5/2011 | Fukui et al. |
| 8,067,136 B2 | 11/2011 | Yano et al. |
| 8,093,342 B2 | 1/2012 | Minami et al. |
| 8,110,329 B2 | 2/2012 | Tominaga et al. |
| 8,178,271 B2 | 5/2012 | Fukui et al. |
| 8,383,312 B2 | 2/2013 | Fujimoto et al. |
| 8,574,801 B2 | 11/2013 | Itabashi et al. |
| 8,609,312 B2 | 12/2013 | Itabashi et al. |
| 8,828,633 B2 | 9/2014 | Itabashi et al. |
| 8,828,639 B2 | 9/2014 | Kamikura et al. |
| 9,029,056 B2 | 5/2015 | Kenmoku et al. |
| 9,098,002 B2 | 8/2015 | Kenmoku et al. |
| 9,098,003 B2 | 8/2015 | Masumoto et al. |
| 9,158,216 B2 | 10/2015 | Shimano et al. |
| 9,377,705 B2 | 6/2016 | Shimano et al. |
| 9,383,668 B2 | 7/2016 | Noji et al. |
| 9,423,708 B2 | 8/2016 | Tominaga et al. |
| 9,423,714 B2 | 8/2016 | Kenmoku et al. |
| 9,575,424 B2 | 2/2017 | Nakagawa et al. |
| 9,599,919 B2 | 3/2017 | Isono et al. |
| 9,658,554 B2 | 5/2017 | Kinumatsu et al. |
| 9,720,340 B2 | 8/2017 | Tominaga et al. |
| 9,733,584 B2 | 8/2017 | Masumoto et al. |
| 9,785,071 B2 | 10/2017 | Shimano et al. |
| 9,798,256 B2 | 10/2017 | Kosaki et al. |
| 9,798,262 B2 | 10/2017 | Toyoizumi et al. |
| 9,811,016 B2 | 11/2017 | Aoki et al. |
| 9,823,595 B2 | 11/2017 | Toyoizumi et al. |
| 9,829,814 B2 | 11/2017 | Yoshida et al. |
| 9,829,816 B2 | 11/2017 | Tanaka et al. |
| 9,829,820 B2 | 11/2017 | Masumoto et al. |
| 9,835,964 B2 | 12/2017 | Yoshida et al. |
| 9,857,711 B2 | 1/2018 | Yoshida et al. |
| 9,857,713 B2 | 1/2018 | Kosaki et al. |
| 9,869,943 B2 | 1/2018 | Aoki et al. |
| 9,880,478 B2 | 1/2018 | Shimano et al. |
| 9,897,932 B2 | 2/2018 | Hotta et al. |
| 9,897,933 B2 | 2/2018 | Yoshida et al. |
| 9,952,523 B2 | 4/2018 | Shimano et al. |
| 9,964,879 B2 | 5/2018 | Terui et al. |
| 10,012,922 B2 | 7/2018 | Yoshida et al. |
| 10,078,285 B2 | 9/2018 | Kubo et al. |
| 10,114,303 B2 | 10/2018 | Katsura et al. |
| 10,295,920 B2 | 5/2019 | Nishikawa et al. |
| 10,295,922 B2 | 5/2019 | Terui et al. |
| 10,303,074 B2 | 5/2019 | Yamawaki et al. |
| 10,303,075 B2 | 5/2019 | Tanaka et al. |
| 10,310,396 B2 | 6/2019 | Kamikura et al. |
| 10,338,487 B2 | 7/2019 | Kamikura et al. |
| 10,345,726 B2 | 7/2019 | Nakamura et al. |
| 10,353,308 B2 | 7/2019 | Hatakeyama et al. |
| 10,401,750 B2 | 9/2019 | Nakamura et al. |
| 10,409,180 B2 | 9/2019 | Koji et al. |
| 10,429,757 B2 | 10/2019 | Yoshida et al. |
| 10,503,090 B2 | 12/2019 | Tominaga et al. |
| 10,539,893 B2 | 1/2020 | Tanaka et al. |
| 10,539,899 B2 | 1/2020 | Nakamura et al. |
| 10,545,422 B2 | 1/2020 | Yamawaki et al. |
| 10,551,758 B2 | 2/2020 | Tanaka et al. |
| 10,635,010 B2 | 4/2020 | Kamikura et al. |
| 10,732,530 B2 | 8/2020 | Matsui et al. |
| 10,747,136 B2 | 8/2020 | Kenmoku et al. |
| 2005/0054063 A1 | 3/2005 | Honma et al. |
| 2005/0260514 A1 | 11/2005 | Mihara et al. |
| 2006/0194071 A1 | 8/2006 | Yano et al. |
| 2012/0172562 A1 | 7/2012 | Kenmoku et al. |
| 2013/0065174 A1 | 3/2013 | Itabashi et al. |
| 2016/0378003 A1* | 12/2016 | Arimura .............. G03G 9/0836 430/110.1 |
| 2019/0384197 A1 | 12/2019 | Aoki et al. |
| 2019/0384200 A1 | 12/2019 | Kamikura et al. |
| 2020/0356019 A1 | 11/2020 | Matsui et al. |

FOREIGN PATENT DOCUMENTS

| | | | |
|---|---|---|---|
| JP | 2008-052021 | * 6/2008 | ............... G03G 9/08 |
| JP | 2011-102892 | 5/2011 | |

OTHER PUBLICATIONS

U.S. Appl. No. 16/934,159, filed Jul. 21, 2020, Harunobu Ogaki.
U.S. Appl. No. 16/935,254, filed Jul. 22, 2020, Takashi Kenmoku.
U.S. Appl. No. 16/935,259, filed Jul. 22, 2020, Akihiko Uchiyama.
U.S. Appl. No. 16/935,263, filed Jul. 22, 2020, Kenta Kamikura.
U.S. Appl. No. 16/935,271, filed Jul. 22, 2020, Kenta Kamikura.
Chemical Handbook, Fundamentals, Revised 5th edition (2004), The Chemical Society of Japan (the table in the back of the front cover).

* cited by examiner

TONER

BACKGROUND OF THE INVENTION

Field of the Invention

The present invention relates to a toner used in recording methods that utilize an electrophotographic method, electrostatic recording method, or a toner jet system recording method.

Description of the Related Art

In recent years the time elapsed until output of a first print has become an important issue in printers and copiers, and various approaches have been studied with a view to shortening that time.

These devices, moreover, require an increase in the number of prints that can be printed by toner cartridges, in order to improve maintainability by reducing the frequency of toner cartridge replacement.

With a view to shortening the above time, toners are demanded that have superior charge rising performance, in terms of becoming charged quickly through friction with a charging member such as charging roller or carrier. The toner becomes charged as a result of migration of charge from the charging member such as a charging roller or carrier, when the toner comes into contact with the charging member. Toners that come in contact with the charging member over numerous times, and to which charge migrates smoothly at the time of contact with the charging member, exhibit thus superior charge rising performance.

Enhancing the flowability of toner is effective in order to increase the number of times that the toner comes into contact with the charging member, while lowering the resistance of toner is effective in order for charge to migrate smoothly at the time of contact with the charging member. Therefore, toners having metal compound fine particles on the surface thereof have been widely studied, for the purpose of improving the charge rising performance by increasing the flowability and lowering resistance of the toner.

Meanwhile, in order to increase the number of prints that can be printed by a toner cartridge, it is necessary to use a toner having excellent durability, with little change in the toner surface and little contamination of the charging member, even over prolonged use. Accordingly, studies have been conducted on toners in which migration and embedding of metal compound fine particles into the charging member over prolonged use are suppressed, through fixing of the metal compound fine particles to the surface of the toner.

Japanese Patent Application Publication No. 2003-107785 discloses a single-component magnetic toner that utilizes concomitantly fusiform hydrophobic rutile/anatase-type titanium oxide having the same or larger work function as that of a toner base particle, and hydrophobic silica.

Japanese Patent Application Publication No. 2004-325756 discloses toner having superior flowability and transfer efficiency, with little migration or embedding of a fluidizing agent onto a charging member. This toner has a coat layer formed through fixing, to one another, of granular agglomerates that contain two or more compounds selected from the group consisting of silicon compounds, aluminum compounds and titanium compounds, on the surface of a toner particle.

As a toner exhibiting superior initial charging performance, and that allows suppressing fluctuation of image density and fogging also after prolonged use, Japanese Patent Application Publication No. 2011-102892 discloses a toner in which the surface of a toner base particle is covered with a titanium compound, and silica and titania are externally added to the toner base particle.

SUMMARY OF THE INVENTION

However, studies by the inventors have revealed that when the toner disclosed in Japanese Patent Application Publication No. 2003-107785 is used over long periods of time, the hydrophobic rutile/anatase-type titanium oxide and the hydrophobic silica on the toner particle may peel off and migrate to the charging member.

It was found that also in the toner disclosed in Japanese Patent Application Publication No. 2004-325756, granular agglomerates containing a titanium compound and an aluminum compound on the toner particle migrate to the charging member, over prolonged use and in a case where the toner is subjected to high loads, i.e. in a high-speed charging process. It was found that, as a result, the charging performance of the toner dropped, and the migrating titanium compound, aluminum compound and the like ended up contaminating the charging member, thereby lowering the charging ability of the charging member. In this case charge rising performance similar to the initial one fails to be achieved on account of the drop in toner charging performance and contamination of the charging member.

It was further found that the charging performance of the toner disclosed in Japanese Patent Application Publication No. 2004-325756 was not necessarily sufficient, and the charge quantity after triboelectric charging tended to not be maintained stably. In a case where a developer that utilizes such a toner is allowed to stand without being stirred, it was found that toner scattering on non-image portions and image defects occur readily in a subsequent developing step, and that high-quality images could not be obtained.

It was found that the toner disclosed in Japanese Patent Application Publication No. 2011-102892 is superior in initial charging performance, but silica and titania migrate from the toner to the charging member with prolonged use. As a result, the charging performance of the toner is impaired, and the migrating silica and titania contaminate the charging member of the toner, as a result of which charge rising performance comparable to the initial performance may fail to be achieved. It was found that in a case where no silica or alumina is externally added in order to suppress charging member contamination, the charge rising performance is lower than the initial one, due to insufficient flowability.

As described above, thus, it is a problem to achieve both superior charging performance and superior durability with prolonged use. It is an object of the present invention, arrived at in the light of the above considerations, to provide a toner that has charge rising performance and stable charging performance, exhibits little changes in the surface state even with prolonged use, is unlikely to result in charging member contamination, and boasts superior durability.

A toner comprising a toner particle, wherein
the toner particle includes a toner base particle containing a binder resin, and a shell on a surface of the toner base particle;
the shell contains a metal compound and an organosilicon polymer;
the shell has at least an exposed portion of the metal compound and an exposed portion of the organosilicon polymer, on a surface of the toner particle; and in a mapping analysis, by energy-dispersive X-ray spectroscopy EDX, of a cross section of the toner particle observed in a transmission electron microscope TEM, Ha (nm) being an average distance from an interface of the toner base particle and the shell up to the toner particle surface, at the exposed portion of the metal compound on the toner particle surface, and Hb (nm) being an average distance from the interface of the toner base particle and the shell up to the toner particle surface, at the exposed portion of the organosilicon polymer on the toner particle surface, satisfy Expression (1) below:

$$Hb > Ha + 20.0 \tag{1}.$$

The present invention succeeds in providing a toner that has charge rising performance and stable charging performance, is unlikely to result in charging member contamination, even with prolonged use, and boasts superior durability.

Further features of the present invention will become apparent from the following description of exemplary embodiments with reference to the attached drawings.

DESCRIPTION OF THE EMBODIMENTS

Figure 1:
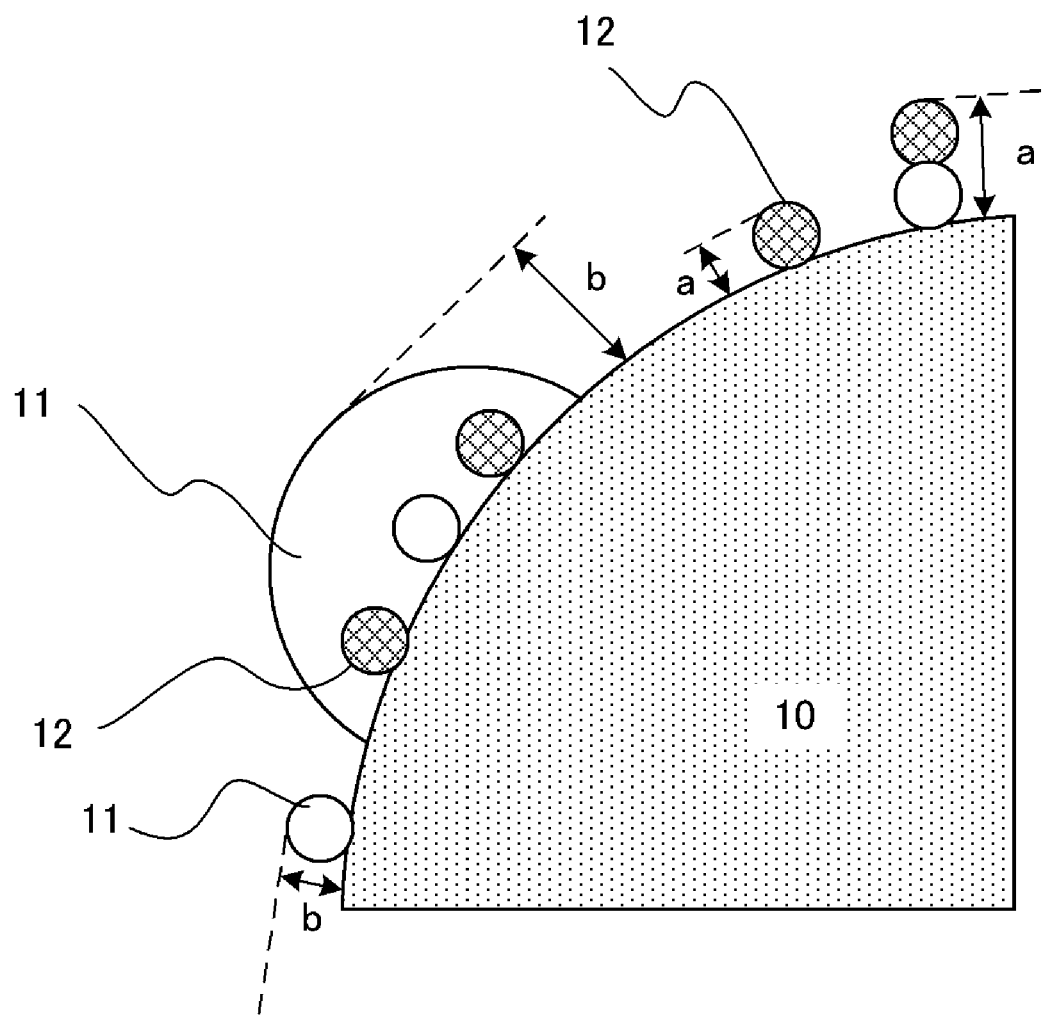
FIG. 1 is an example of a mapping image of a toner particle cross section by TEM-EDX.

Unless otherwise specified, descriptions of numerical ranges such as "from XX to YY" or "XX to YY" in the present invention include the numbers at the upper and lower limits of the range.

A toner according to the present invention includes a toner particle, wherein the toner particle includes a toner base particle containing a binder resin, and a shell on a surface of the toner base particle;

the shell contains a metal compound and an organosilicon polymer;

the shell has at least an exposed portion of the metal compound and an exposed portion of the organosilicon polymer, on a surface of the toner particle; and in a mapping analysis, by energy-dispersive X-ray spectroscopy EDX, of a cross section of a toner particle observed in a transmission electron microscope TEM, Ha (nm) being an average distance from an interface of the toner base particle and the shell up to the toner particle surface, at the exposed portion of the metal compound on the toner particle surface, and Hb (nm) being an average distance from the interface of the toner base particle and the shell up to the toner particle surface, at the exposed portion of the organosilicon polymer on the toner particle surface, satisfy Expression (1) below:

$$Hb > Ha + 20.0 \tag{1}.$$

Studies by the inventors have revealed that the resistance value of the toner particle decreases, and charging characteristics improve, in a case where a metal compound is present on the surface of the toner particle, and that peeling or burying of the metal compound occur readily at the toner particle surface when the toner is used over long periods of time. The state of the toner particle surface changes on account of peeling or burying of the metal compound. The state of the surface of the charging member may change, and also the performance of the charging member may change, due to adhesion of the metal compound to the charging member.

As a result of diligent research aimed at overcoming the above phenomenon, the inventors found that by adopting the above specific configuration a toner can be provided that has superior charge rising performance and stable charging performance, does not readily cause contamination of the charging member with prolonged use, and boasts superior durability.

By virtue of the fact that the shell in the toner contains a metal compound and an organosilicon polymer, the fixed state of the metal compound on the toner particle surface is stronger, and peeling of the metal compound is further suppressed, as compared with conventional toners.

The flowability of the toner is enhanced, and charge rising performance improved, thanks to the low surface free energy of the organosilicon polymer.

In a mapping analysis, by energy-dispersive X-ray spectroscopy EDX, of a cross section of a toner particle observed in a transmission electron microscope TEM, Ha (nm) being an average distance from the interface of the toner base particle and the shell up to the toner particle surface, at the exposed portion of the metal compound on the toner particle surface, and Hb (nm) being an average distance from the interface of the toner base particle and the shell up to the toner particle surface, at the exposed portion of the organosilicon polymer on the toner particle surface, must satisfy $Hb > Ha + 20.0$.

By satisfying the above relationship, the exposed portion of the organosilicon polymer constitutes a spacer. The contact area between toner particle surfaces decreases thereby. The inventors consider that, as a result, the flowability of the toner particle improves, peeling of the metal compound is suppressed, and burying of the metal compound is likewise suppressed.

As a novel effect, a charge quantity after triboelectric charging tends to be stabilized through formation thereon of the exposed portion of the organosilicon polymer on the toner particle surface. Generally, charge rising performance improves when the metal compound is present in large amounts on the toner particle surface, but charge moves rapidly, and the charge quantity tends to become unstable, as a result of contact of charged toner particles with each other. It is deemed that the charge quantity is stabilized through suppression of contact of the metal compound on the toner particle surface, by virtue of the fact that the exposed portion of the organosilicon polymer constitutes a spacer.

More preferably, there holds $Hb > Ha + 40.0$. Preferably, Hb-Ha is 200.0 or less, and more preferably 100.0 or less.

The values obtained in accordance with the method below are used as Ha and Hb.

A cross-sectional observation of the toner particle is carried out using a transmission electron microscope (hereafter referred to as TEM), and constituent elements of the toner particle are analyzed by energy-dispersive X-ray spectroscopy (hereafter referred to as EDX), to produce an EDX mapping image. Signals derived from the constituent elements of the metal compound and the organosilicon polymer are ascertained on the contour of the cross section of the toner particle in the EDX mapping image.

Upon observation of a signal of the metal compound and a signal of the organosilicon polymer on the surface of the toner particle (cross section contour), Ha and Hb are calculated with the foregoing signals serving as the metal compound exposed portion and the exposed portion of the organosilicon polymer. The detailed measurement method will be described further on.

A more preferred fixed state of the shell that makes up the toner will be described in detail next.

When the toner is subjected to a treatment (a) in which 1.0 g of the toner is dispersed in a mixed aqueous solution made up of 31.0 g of a 61.5 mass % aqueous solution of sucrose and 6.0 g of a 10.0 mass % aqueous solution of a neutral detergent for cleaning of precision measuring instruments made up of a nonionic surfactant, an anionic surfactant and an organic builder, and shaken for 20 minutes at 300 strokes per minute using a shaker, and is subjected to a treatment (b) in which the toner subjected to the treatment (a) is dispersed in the mixed aqueous solution, and applied with ultrasound at an electrical output of 120 W for 10 minutes, a coverage ratio of the shell in the toner after the treatment (b) is preferably 80.0 area % or higher.

More preferably, the coverage ratio is 85.0 area % or higher. The upper limit is not particularly restricted, but is preferably 98.0 area % or less, more preferably 95.0 area % or less.

The treatment (a) is a treatment of removing an external additive (organic fine particles or inorganic fine particles) from the toner particle surface. Such a treatment allows checking the properties of a toner particle (or a particle to which no external additive is added) prior to addition of the external additive.

Further, the treatment (b) is a treatment for removing the shell made up of the organosilicon polymer and the metal compound in a comparatively weak fixed state. The coverage ratio of the shell made up of the metal compound and organosilicon polymer fixed to the toner base particle surface can be measured through observation of a sample subjected to the above treatment.

Charge rising can be improved when the coverage ratio lies in the above range.

The coverage ratio can be controlled in accordance with the addition method of starting materials in a shell generation method described below.

Preferably, in an X-ray fluorescence analysis, when M1 (detected intensity kcps) denotes an amount of metal contained in the metal compound, and Si1 (detected intensity kcps) denotes an amount of silicon contained in the organosilicon polymer, in the toner after execution of the treatment (a) and prior to execution of the treatment (b), and M2 (detected intensity kcps) denotes the amount of metal contained in the metal compound and Si2 (detected intensity kcps) denotes the amount of silicon included in the organosilicon polymer, in the toner after execution of the treatment (b), Expression (2) and (3) below are satisfied:

$$M2/M1 \geq 0.90 \quad (2)$$

$$Si2/Si1 \geq 0.90 \quad (3).$$

The above M2/M1 in formula (2) signifies a ratio when the metal compound does not peel off the toner particle surface in the treatment (b). In a case where M2/M1 is 0.90 or higher, peeling of the metal compound off the toner particle surface can be suppressed, and toner of superior durability can be obtained.

The above Si2/Si1 in formula (3) signifies a ratio when the organosilicon polymer does not peel off the toner particle surface in the treatment (b). In a case where Si2/Si1 is 0.90 or higher, peeling of the organosilicon polymer off the toner particle surface and burying of the metal compound in the toner particle surface are suppressed, and toner of superior durability can be obtained.

More preferably, M2/M1 is 0.95 or higher. The upper limit is not particularly restricted, but is preferably 1.00 or less, more preferably 0.99 or less.

More preferably, Si2/Si1 is 0.95 or higher. The upper limit is not particularly restricted, but is preferably 1.00 or less, more preferably 0.99 or less.

Herein M2/M1 and Si2/Si1 can be controlled for instance on the basis of the type of the organosilicon compound that constitutes a starting material of the organosilicon polymer, and the adhesion conditions of the organosilicon polymer during production of the toner, in the below-described shell generation method.

Preferably, the metal compound in the toner particle is in the form of fine particles. As a result the flowability of the toner particle can be improved, and the resistance value becomes easier to control.

Preferably, the exposed portion of the organosilicon polymer in the toner particle is in the form of a semisphere having a cross section being an interface of the organosilicon polymer and the toner base particle. As a result the contact area of the exposed portion and the toner base particle increases, such that a normal-direction load acting on the toner particle can be dispersed, and peeling of the organosilicon polymer over prolonged use can likewise be suppressed. In a case where the exposed portion is formed out of a spherical external additive of large particle diameter, the normal-direction load acting on the toner particle is concentrated at one point, on account of the spherical shape, and the external additive may peel or sink as a result of prolonged use.

The term semisphere encompasses substantially semispherical shapes, and it suffices that the shape be has a curved surface and is close to semispherical. The semispherical shape encompasses for instance also a true semispherical shape and a semielliptical shape. The term semispherical encompasses a shape resulting from cutting a sphere along a plane passing through the center of the sphere, i.e. a shape resulting from halving a sphere. The term semispherical encompasses also a shape resulting from cutting a sphere along a plane that does not pass through the center of the sphere, i.e. a shape larger than half of a sphere, as well as a shape smaller than half of a sphere.

Whether or not the exposed portion of the organosilicon polymer has a semispherical shape can be determined herein by for instance checking the shape of the signal of the exposed portion of the organosilicon polymer in a mapping image obtained by TEM-EDX described below. In the mapping image, the exposed portion of the organosilicon polymer preferably forms a protruding shape on the toner particle surface, and more preferably the exposed portion is present as a semicircular shape.

The term semicircular encompasses substantially semicircular shapes, and it suffices that the shape has a curved line and is close to semicircular. The semicircular shape encompasses for instance a true semicircle, and a semiellipse. The term semicircular encompasses a shape resulting from cutting a circle along a straight line passing through the center of the circle, i.e. a shape resulting from halving a circle. The term semicircular encompasses also a shape resulting from cutting a circle along a straight line that does not pass through the center of the circle, i.e. a shape larger than half of a circle, as well as a shape smaller than half of a circle.

Preferably, an average distance Ha (nm) from the interface of the toner base particle and the shell up to the toner particle surface, at the exposed portion of the metal compound on the toner particle surface, and an average distance Hb (nm) from the interface of the toner base particle and the shell up to the toner particle surface, at the exposed portion of the organosilicon polymer on the toner particle surface, satisfy Expressions (4) and (5) below:

$$2.5 \leq Ha \leq 50.0 \quad (4)$$

$$30.0 \leq Hb \leq 300.0 \quad (5).$$

Herein Ha (nm) is preferably from 2.5 nm to 50.0 nm.

In a case where Ha satisfies the above range, a toner can be obtained that exhibits excellent flowability, with suppressed peeling and ensuing migration of metal compound fine particles to the charging member, and that boasts superior durability. From the above standpoint, Ha is more preferably from 5.0 nm to 30.0 nm. For instance, Ha can be controlled by modifying the type and addition amount of materials, pH, temperature and so forth, at the time of adhesion of the metal compound on the toner base particle.

Herein Hb (nm) is preferably from 30.0 nm to 300.0 nm. By virtue of the fact that Hb lies within the above range, the exposed portion of the organosilicon polymer can elicit an effect of constituting a spacer between toner particles, such that peeling and burying of the metal compound fine particles are suppressed, and the charge quantity of the toner particle is stabilized. From the above standpoint, Hb is more preferably from 50.0 nm to 200.0 nm.

For instance Hb can be controlled on the basis of the type and addition amount of an organosilicon compound at the time of a condensation reaction of the organosilicon compound, after production method (a) or (b) described below. Further, Hb can be controlled through modification of pH and temperature.

The metal compound used in the toner particle will be described in detail next.

The volume resistivity of the metal compound is preferably from $1.0 \times 10^5$ Ω·cm to $1.0 \times 10^{11}$ Ω·cm, more preferably from $1.0 \times 10^7$ Ω·cm to $1.0 \times 10^9$ Ω·cm.

The volume resistivity of the metal compound can be calculated by clamping a powder of fine particles of the metal compound between electrodes and applying a constant load using a torque wrench, and in that state, measuring the distance between the electrodes and a resistance value. The detailed measurement method will be described below.

The resistance value of the toner particle surface drops, and charge rising properties are readily obtained, by setting the volume resistivity of the fine particles of the metal compound to lie within the above range, and through coating of the surface of the toner base particle together with the organic silicon polymer.

Preferably, the metal compound includes at least one metal element M selected from the group consisting of metal elements included in group 3 to group 13. The resistance value of the toner particle surface drops, and the charge rising performance of the toner improves, through arrangement of the metal compound containing at least one metal element selected from among metal elements included in group 3 to group 13.

Specific examples include for instance at least one selected from the group consisting of for instance titanium, zirconium, hafnium, copper, iron, silver, zinc, indium and aluminum.

The metal compound is preferably a reaction product of a compound containing the metal element M and a polyhydric acid, preferably a salt of a polyhydric acid and the metal element M. The polyhydric acid becomes readily charged negatively by receiving an electron pair. Therefore, both the polyhydric acid and the compound containing the metal element M are readily charged negatively, and exhibit superior charging performance.

Therefore, charge moves smoothly from the charging member to the toner particle via the compound containing the metal element M, by virtue of the fact that the reaction product of the compound containing the metal element M and the polyhydric acid is present on the toner particle surface; this results in a better charge rising performance of the toner.

The Pauling electronegativity of the metal element M is preferably from 1.25 to 1.85, more preferably 1.30 to 1.70. A metal compound containing a metal element M that has electronegativity lying within the above range is hydrophobic and has suppressed hygroscopicity, while exhibiting in addition large polarization within the metal compound, and thus the effect on charge rising performance can be made thus more pronounced as a result.

The values given in the table in the back of the front cover of "Chemical Handbook, Basic Edition", revised 5th edition, edited by The Chemical Society of Japan (2004) (Maruzen Publishing) are used herein for Pauling electronegativity.

The polyhydric acid is not particularly limited so long as it is a divalent or higher acid. A reaction product of a divalent or higher acid and compounds containing the metal element M forms a crosslinked structure between the compound and the polyhydric acid; this crosslinked structure promotes electron transfer, which translates into a better charge rising performance.

Specific examples of the polyhydric acid include the following.

Inorganic acids such as phosphoric acid, carbonic acid and sulfuric acid; and organic acids such as dicarboxylic acids and tricarboxylic acids.

The organic acids can be specifically exemplified by dicarboxylic acids such as oxalic acid, malonic acid, succinic acid, glutaric acid, adipic acid, fumaric acid, maleic acid, pimelic acid, suberic acid, azelaic acid, sebacic acid, phthalic acid, isophthalic acid, and terephthalic acid, and by tricarboxylic acids such as citric acid, aconitic acid, and trimellitic anhydride.

Among the foregoing, the polyhydric acid preferably contains at least one selected from the group consisting of carbonic acid, sulfuric acid and phosphoric acid. The foregoing react strongly with the compound containing the metal element M and do not readily absorb moisture. More preferably, the polyhydric acid contains phosphoric acid.

The polyhydric acid may be used as it is, or may be used in the form of an alkali metal salt of sodium, potassium, lithium or the like and the polyhydric acid, or an alkaline earth metal salt of magnesium, calcium, strontium, barium or the like and the polyhydric acid; or in the form of an ammonium salt of the polyhydric acid.

The metal compound is preferably a metal salt of a polyhydric acid. The metal compound is preferably at least one selected from the group consisting of metal phosphates, metal sulfates, and metal carbonates. Examples of the compound containing the metal element M include metal alkoxides such as tetraisopropyl titanate and metal chelates such as titanium lactate. Concrete examples of the reaction product of a polyhydric acid and compounds containing a metal element M include the following.

Metal salts of phosphoric acid typified by reaction products of phosphoric acid and compounds containing titanium, reaction products of phosphoric acid and compounds containing zirconium, reaction products of phosphoric acid and compounds containing aluminum, reaction products of phosphoric acid and compounds containing copper, and reaction products of phosphoric acid and compounds containing iron;-metal salts of sulfuric acid typified by reaction products of sulfuric acid and compounds containing titanium, reaction products of sulfuric acid and compounds containing zirconium, and reaction products of sulfuric acid and compounds containing silver; and metal salts of carbonic acid typified by reaction products of carbonic acid and compounds containing titanium, reaction products of carbonic acid and compounds containing zirconium, and reaction products of carbonic acid and compounds containing iron.

More preferred among these are metal phosphates and metal carbonates, and among the foregoing, yet more preferable are metal phosphates, since phosphate ions elicit crosslinking between metals, which results in higher strength, while ionic bonds within the molecule translate also into superior charge rising performance. The metal element M is preferably at least one selected from the group consisting of Zr, Ti and Al, from the viewpoint of availability as a compound of a metal phosphate. Specifically, zirconium phosphate compounds, titanium phosphate compounds, and aluminum phosphate compounds are preferable herein.

The content of the metal compound in the toner particle is preferably from 0.01 mass % to 5.00 mass %, more preferably from 0.02 mass % to 3.00 mass %, and yet more preferably from 0.05 mass % to 2.00 mass %.

The organosilicon polymer used in the toner particle will be described in detail next.

The toner particle includes a toner base particle containing a binder resin, and a shell on the surface of the toner base particle. The shell contains a metal compound and an organosilicon polymer.

There are no particular limitations on the organosilicon polymer and known organosilicon polymers can be used. Among these, the use is preferred of an organosilicon polymer having the structure represented by the following formula (I).

$$R—SiO_{3/2} \qquad (I)$$

(In formula (I), R represents an alkyl group having preferably 1 to 8 and more preferably 1 to 6 carbons, an alkenyl group having preferably 1 to 6 and more preferably 1 to 4 carbons, an acyl group having preferably 1 to 6 and more preferably 1 to 4 carbons, an aryl group having preferably 6 to 14 and more preferably 6 to 10 carbons, or a methacryloxyalkyl group.)

Formula (I) shows that the organosilicon polymer has an organic group and a silicon polymer moiety. Due to this, an organosilicon polymer containing the formula (I) structure tightly bonds to the toner base particle because the organic group exhibits affinity for the toner base particle, and tightly bonds to the polyhydric acid metal salt because the silicon polymer moiety exhibits affinity for the polyhydric acid metal salt. As a result, the polyhydric acid metal salt can be more strongly immobilized on the toner base particle because the organosilicon polymer acts to bond the toner base particle to the polyhydric acid metal salt.

Formula (I) also shows that the organosilicon polymer is crosslinked. The strength of the organosilicon polymer is increased because the organosilicon polymer has a crosslinked structure, while the hydrophobicity is increased because there is little residual silanol group. A toner can thus be obtained that has an even better durability and that exhibits stable properties even in high-humidity environments.

The R in formula (I) is preferably an alkyl group having from 1 to 6 carbons, e.g., the methyl group, propyl group, normal-hexyl group, and so forth, or a vinyl group, phenyl group, or methacryloxypropyl group, with an alkyl group having from 1 to 6 carbons and the vinyl group being more preferred.

Due to control of the molecular mobility of the organic group, an organosilicon polymer having the instant structure has both hardness and flexibility, and as a consequence deterioration of the toner is suppressed, even in the case of long-term use, and excellent properties are exhibited.

Known organosilicon compounds can be used without particular limitation as the organosilicon compound for obtaining the organosilicon polymer. Among these, at least one selection from the group consisting of organosilicon compounds having the following formula (II) is preferred.

$$R—Si—Ra_3 \qquad (II)$$

Where, in formula (II), each Ra independently represents a halogen atom or an alkoxy group (preferably having 1 to 4 carbons and more preferably 1 to 3 carbons), and each R independently represents an alkyl group (preferably having 1 to 8 carbons and more preferably 1 to 6 carbons), an alkenyl group (preferably having 1 to 6 carbons and more preferably 1 to 4 carbons), an aryl group (preferably having 6 to 14 carbons and more preferably 6 to 10 carbons), an acyl group (preferably having 1 to 6 carbons and more preferably 1 to 4 carbons), or a methacryloxyalkyl group.

The trifunctional silane compounds can be exemplified by the following compounds:

trifunctional methylsilane compounds such as methyltrimethoxysilane, methyltriethoxysilane, methyldiethoxymethoxysilane, and methylethoxydimethoxysilane;

trifunctional silane compounds such as ethyltrimethoxysilane, ethyltriethoxysilane, propyltrimethoxysilane, propyltriethoxysilane, butyltrimethoxysilane, butyltriethoxysilane, hexyltrimethoxysilane, and hexyltriethoxysilane;

trifunctional phenylsilane compounds such as phenyltrimethoxysilane and phenyltriethoxysilane;

trifunctional vinylsilane compounds such as vinyltrimethoxysilane and vinyltriethoxysilane;

trifunctional allylsilane compounds such as allyltrimethoxysilane, allyltriethoxysilane, allyldiethoxymethoxysilane, and allylethoxydimethoxysilane; and trifunctional γ-methacryloxypropylsilane compounds such as γ-methacryloxypropyltrimethoxysilane, γ-methacryloxypropyltriethoxysilane, γ-methacryloxypropyldiethoxymethoxysilane, and γ-methacryloxypropylethoxydimethoxysilane.

The R in formula (II) is preferably an alkyl group having from 1 to 6 carbons, e.g., the methyl group, propyl group, normal-hexyl group, and so forth, or a vinyl group, phenyl group, or methacryloxypropyl group, with an alkyl group having from 1 to 6 carbons and the vinyl group being more preferred. This makes it possible to obtain an organosilicon polymer that satisfies the preferred range for formula (I).

When Ra is an alkoxy group, the organosilicon polymer can be obtained in a stable manner because a suitable reactivity in aqueous media is exhibited, and this is thus preferred. Ra is more preferably the methoxy group or ethoxy group.

The content of the organosilicon polymer in the toner particle is preferably from 0.01 mass % to 20.0 mass %, more preferably from 0.1 mass % to 10.0 mass %.

The rise-up of charging is yet higher in a case where content of the organosilicon polymer lies in the above range. The above content can be controlled on the basis of the amount of an organosilicon compound used as a starting material.

The toner base particle will be described in detail next.

The method for producing the toner base particle is not particularly limited, and for instance a suspension polymerization method, a dissolution suspension method, an emulsion aggregation method or a pulverization method can be used herein.

Suspension polymerization is preferred among the foregoing.

In a case where the toner base particle is produced in an aqueous medium, the aqueous medium may be used as-is in the form of an aqueous dispersion for forming a shell; alternatively, a toner base particle obtained after washing, filtration and drying may be re-dispersed in an aqueous medium.

In a case where the toner base particle is produced in accordance with a dry scheme, the toner base particle may be dispersed in an aqueous medium in accordance with a known method. Preferably, the aqueous medium contains a dispersion stabilizer, in order to disperse the toner base particle in the aqueous medium.

The method of obtaining the toner base particle by suspension polymerization is described in the following as an example.

First, the polymerizable monomer that will produce the binder resin is mixed with any optional additives, and, using a disperser, a polymerizable monomer composition is prepared in which these materials are dissolved or dispersed.

The additives can be exemplified by colorants, waxes, charge control agents, polymerization initiators, chain transfer agents, and so forth.

The disperser can be exemplified by homogenizers, ball mills, colloid mills, and ultrasound dispersers.

The polymerizable monomer composition is then introduced into an aqueous medium that contains sparingly water-soluble inorganic fine particles, and droplets of the polymerizable monomer composition are prepared using a high-speed disperser such as a high-speed stirrer or an ultrasound disperser (granulation step).

The toner base particle is then obtained by polymerizing the polymerizable monomer in the droplets (polymerization step).

The polymerization initiator may be admixed during the preparation of the polymerizable monomer composition or may be admixed into the polymerizable monomer composition immediately prior to the formation of the droplets in the aqueous medium.

In addition, it may also be added, optionally dissolved in the polymerizable monomer or another solvent, during granulation into the droplets or after the completion of granulation, i.e., immediately before the initiation of the polymerization reaction.

After the binder resin has been obtained by the polymerization of the polymerizable monomer, the toner base particle dispersion may be obtained by the optional execution of a solvent removal process.

The binder resin used in the toner particle will be described in detail next.

Specific examples of the binder resin are vinyl resins, polyester resins, polyurethane resins, and polyamide resins.

The polymerizable monomer that can be used to produce the vinyl resin can be exemplified by the following: styrene and styrenic monomers such as α-methylstyrene;

acrylate esters such as methyl acrylate and butyl acrylate;

methacrylate esters such as methyl methacrylate, 2-hydroxyethyl methacrylate, t-butyl methacrylate, and 2-ethylhexyl methacrylate;

unsaturated carboxylic acids such as acrylic acid and methacrylic acid;

unsaturated dicarboxylic acids such as maleic acid;

unsaturated dicarboxylic acid anhydrides such as maleic anhydride;

nitrile-type vinyl monomers such as acrylonitrile; halogenated vinyl monomers such as vinyl chloride; and nitro-type vinyl monomers such as nitrostyrene.

A styrene acrylic copolymer is preferred as the vinyl resin. A graft polymer in which a styrene acrylic copolymer is grafted on polyethylene can be used herein.

Among the foregoing, a vinyl resin or a polyester resin is preferably present as the binder resin. Polyester resins have high affinity with metal compound fine particles, and accordingly migration of the metal compound fine particles to the charging member can be readily suppressed. The exchange of charge with the metal compound fine particles is smooth, and in consequence the charge quantity distribution of the toner is sharper.

Heretofore known monomers may be used without particular limitation as the polymerizable monomer when the binder resin is obtained by, for example, an emulsion aggregation method or a suspension polymerization method.

Specific examples in this regard are the vinyl monomers provided as examples in the section on the binder resin.

A known polymerization initiator may be used without particular limitation as the polymerization initiator.

The following are specific examples:

peroxide-type polymerization initiators such as hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, ammonium persulfate, sodium persulfate, potassium persulfate, diisopropyl peroxycarbonate, tetralin hydroperoxide, 1-phenyl-2-methylpropyl-1-hydroperoxide, pertriphenylacetic acid-tert-hydroperoxide, tert-butyl performate, tert-butyl peracetate, tert-butyl perbenzoate, tert-butyl perphenylacetate, tert-butyl permethoxyacetate, per-N-(3-tolyl)palmitic acid-tert-butylbenzoyl peroxide, t-butyl peroxy-2-ethylhexanoate, t-butyl peroxypivalate, t-butyl peroxyisobutyrate, t-butyl peroxyneodecanoate, methyl ethyl ketone peroxide, diisopropyl peroxycarbonate, cumene hydroperoxide, 2,4-dichlorobenzoyl peroxide, and lauroyl peroxide; and azo and diazo polymerization initiators as represented by 2,2'-azobis(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile.

The toner particle may contain a colorant. The heretofore known magnetic bodies and pigments and dyes in the colors of black, yellow, magenta, and cyan as well as in other colors may be used without particular limitation as this colorant.

The black colorant can be exemplified by black pigments such as carbon black.

The yellow colorant can be exemplified by yellow pigments and yellow dyes, e.g., monoazo compounds, disazo compounds, condensed azo compounds, isoindolinone compounds, benzimidazolone compounds, anthraquinone compounds, azo metal complexes, methine compounds, and allylamide compounds.

Specific examples are C. I. Pigment Yellow 74, 93, 95, 109, 111, 128, 155, 174, 180, and 185 and C. I. Solvent Yellow 162.

The magenta colorants can be exemplified by magenta pigments and magenta dyes, e.g., monoazo compounds, condensed azo compounds, diketopyrrolopyrrole compounds, anthraquinone compounds, quinacridone compounds, basic dye lake compounds, naphthol compounds, benzimidazolone compounds, thioindigo compounds, and perylene compounds.

Specific examples are C. I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, 238, 254, and 269, and C. I. Pigment Violet 19.

The cyan colorants can be exemplified by cyan pigments and cyan dyes, e.g., copper phthalocyanine compounds and derivatives thereof, anthraquinone compounds, and basic dye lake compounds.

Specific examples are C. I. Pigment Blue 1, 7, 15, 15:1, 15:2, 15:3, 15:4, 60, 62, and 66.

The colorant amount, considered per 100.0 mass parts of the binder resin or polymerizable monomer, is preferably from 1.0 mass parts to 20.0 mass parts.

The toner may also be made into a magnetic toner by the incorporation of a magnetic body.

In this case, the magnetic body may also function as a colorant.

The magnetic body can be exemplified by iron oxides as represented by magnetite, hematite, and ferrite; metals as represented by iron, cobalt, and nickel; alloys of these metals with a metal such as aluminum, cobalt, copper, lead, magnesium, tin, zinc, antimony, beryllium, bismuth, cadmium, calcium, manganese, selenium, titanium, tungsten, and vanadium; and mixtures thereof.

The toner particle may contain a wax.

Specifically the following wax can be used: esters between a monohydric alcohol and a monocarboxylic acid, e.g., behenyl behenate, stearyl stearate, and palmityl palmitate; esters between a dibasic carboxylic acid and a monoalcohol, e.g., dibehenyl sebacate; esters between a dihydric alcohol and a monocarboxylic acid, e.g., ethylene glycol distearate and hexanediol dibehenate; esters between a trihydric alcohol and a monocarboxylic acid, e.g., glycerol tribehenate; esters between a tetrahydric alcohol and a monocarboxylic acid, e.g., pentaerythritol tetrastearate and pentaerythritol tetrapalmitate; esters between a hexahydric alcohol and a monocarboxylic acid, e.g., dipentaerythritol hexastearate and dipentaerythritol hexapalmitate; esters between a polyfunctional alcohol and a monocarboxylic acid, e.g., polyglycerol behenate; natural ester waxes such as carnauba wax and rice wax; petroleum-based hydrocarbon waxes, e.g., paraffin wax, microcrystalline wax, and petrolatum, and derivatives thereof; hydrocarbon waxes provided by the Fischer-Tropsch method and derivatives thereof; polyolefin-type hydrocarbon waxes, e.g., polyethylene wax and polypropylene wax, and their derivatives; higher aliphatic alcohols; fatty acids such as stearic acid and palmitic acid; and acid amide waxes.

From the standpoint of the release performance, the wax amount, considered per 100.0 mass parts of the binder resin or polymerizable monomer, is preferably from 1.0 mass parts to 30.0 mass parts and is more preferably from 5.0 mass parts to 20.0 mass parts.

The toner particle may contain a charge control agent. The heretofore known charge control agents may be used without particular limitation as this charge control agent.

Negative-charging charge control agents can be specifically exemplified by metal compounds of aromatic carboxylic acids such as salicylic acid, alkylsalicylic acid, dialkylsalicylic acid, naphthoic acid, and dicarboxylic acids, and by polymers and copolymers that contain such a metal compound of an aromatic carboxylic acid;

polymers and copolymers bearing a sulfonic acid group, sulfonate salt group, or sulfonate ester group;

metal salts and metal complexes of azo dyes and azo pigments; and boron compounds, silicon compounds, and calixarene.

The positive-charging charge control agents, on the other hand, can be exemplified by quaternary ammonium salts and polymeric compounds that have a quaternary ammonium salt in side chain position; guanidine compounds; nigrosine compounds; and imidazole compounds.

The polymers and copolymers that have a sulfonate salt group or sulfonate ester group can be exemplified by homopolymers of a sulfonic acid group-containing vinyl monomer such as styrenesulfonic acid, 2-acrylamido-2-methylpropanesulfonic acid, 2-methacrylamido-2-methylpropanesulfonic acid, vinylsulfonic acid, and methacrylsulfonic acid, and by copolymers of these sulfonic acid group-containing vinyl monomers with other vinyl monomer as indicated in the section on the binder resin.

The charge control agent amount, considered per 100.0 mass parts of the binder resin or polymerizable monomer, is preferably from 0.01 mass parts to 5.0 mass parts.

By virtue of being covered with the shell containing the metal compound and the organosilicon polymer, the toner particle exhibits characteristics such as superior flowability also in the absence of an external additive. Accordingly, the toner particle may be used, as-is, as a toner. A toner may be obtained by adding an external additive to the toner particle, for the purpose of achieving further improvements.

The heretofore known external additives may be used without particular limitation as this external additive.

Specific examples are as follows: base silica fine particles, e.g., silica produced by a wet method, silica produced by a dry method, and so forth; silica fine particles provided by subjecting such base silica fine particles to a surface treatment with a treatment agent such as a silane coupling agent, titanium coupling agent, silicone oil, and so forth; and resin fine particles such as vinylidene fluoride fine particles, polytetrafluoroethylene fine particles, and so forth.

The amount of the external additive is preferably from 0.1 mass parts to 5.0 mass parts per 100.0 mass parts of the toner particle.

A method for producing a toner particle will be described next in detail.

The method for producing the toner particle is not particularly limited, and the toner particle may be produced in accordance with either production method (a) or production method (b) below.

In production method (a), firstly a metal source constituting the starting material of the metal compound is caused to react with an acid or water in an aqueous medium having a toner base particle dispersed therein, and the metal compound is caused to precipitate as fine particles, to adhere to the toner base particle. Thereafter or simultaneously therewith, the organosilicon compound is subjected to a condensation reaction, to cause an organosilicon polymer to precipitate in the form of fine particles, that become adhered to the surface of the toner base particle already covered with the fine particles of the metal compound, to thereby yield a toner particle having a shell that contains a metal compound and an organosilicon polymer.

In production method (b), firstly metal compound fine particles are added to an aqueous medium having a toner base particle dispersed therein, so that the metal compound fine particles become adhered to the toner base particle. Thereafter or simultaneously therewith, the organosilicon compound is subjected to a condensation reaction, and the organosilicon polymer is allowed to precipitate in the form of fine particles, and to adhere to the surface of the toner base particle covered with the fine particles of the metal compound, to thereby yield a toner particle.

In a case where a toner is obtained in accordance with production method (a), the metal source is not particularly limited, and conventionally known metal compounds can be used herein. Specific examples include the following.

Metal chelate compounds typified by for instance titanium diisopropoxybisacetylacetonate, titanium tetraacetylacetonate, titanium diisopropoxybisethylacetoacetate, titanium di-2-ethylhexoxybis-2-ethyl-3-hydroxyhexoxide, titanium diisopropoxybisethyl acetoacetate, titanium lactate, titanium ammonium lactate, titanium diisopropoxybistriethanolaminate, titanium isostearate, titanium aminoethylaminoethanolate and titanium triethanolaminate;

zirconium tetraacetylacetonate, zirconium tributoxymonoacetylacetonate, zirconium dibutoxybis(ethylacetoacetate), zirconium lactate and zirconium ammonium lactate; and aluminum lactate, aluminum ammonium lactate, aluminum trisacetylacetonate, aluminum bisethylacetoacetate monoacetylacetonate and aluminum trisethylacetoacetate;

iron (II) lactate; copper (II) lactate; and silver (I) lactate;

metal alkoxide compounds typified by for instance tetraisopropyl titanate, tetrabutyl titanate, tetraoctyl titanate, zirconium tetrapropoxide, zirconium tetrabutoxide, aluminum sec-butoxide, aluminum isopropoxide, trisisopropoxy iron, tetraisopropoxy hafnium and the like; and metal halides typified by titanium chloride, zirconium chloride, aluminum chloride and the like.

Using a metal chelate compound, among the foregoing, is preferred since in that case aggregation of the metal compound fine particles can be curtailed through suppression of the reaction rate, so that a toner is readily obtained as a result that satisfies the above coverage ratio and Expressions (1) to (5).

Yet more preferable are titanium lactate, titanium lactate ammonium salt, zirconium lactate, zirconium lactate ammonium salt, aluminum lactate and aluminum lactate ammonium salt.

In a case where the toner is obtained in accordance with production method (a), a conventionally known acid can be used as the acid, without particular limitations. Specific acids include the following:

inorganic polyhydric acids typified by phosphoric acid, carbonic acid, sulfuric acid and the like;

inorganic monovalent acids typified by nitric acid and the like;

organic polyhydric acids such as oxalic acid, malonic acid, succinic acid, glutaric acid, adipic acid, fumaric acid, maleic acid, pimelic acid, suberic acid, azelaic acid, sebacic acid, phthalic acid, isophthalic acid and terephthalic acid; and organic monovalent acids typified by formic acid, acetic acid, benzoic acid, trifluoroacetic acid and the like. Preferably, inorganic polyhydric acids are used among the foregoing, since inorganic polyhydric acids afford superior durability in that metal compound fine particles of high strength are obtained through crosslinking between metal atoms when an inorganic polyhydric acid is used.

More preferably, phosphate ions are used herein. The above acids may be used in the form of the acid as-is, or may be used in the form of an alkali metal salt of sodium, potassium, lithium or the like, or an alkaline earth metal salt of magnesium, calcium, strontium, barium or the like, or in the form of an ammonium salt.

In production method (a) and production method (b), preferably, a condensation reaction of the organosilicon compound is carried out simultaneously with adhesion of the metal compound fine particles to the toner base particle. Thereby, aggregation of the metal compound fine particles can be suppressed, and the metal compound fine particles can be fixed to the toner base particle.

Specifically, firstly the organosilicon compound represented by the Formula (I) is hydrolyzed beforehand or is hydrolyzed in a dispersion of the toner base particle. Thereafter the obtained hydrolysate of the organosilicon compound is condensed, to yield a condensate.

The condensate migrates to the surface of the toner base particle. The condensate has viscosity, and as a result the metal compound fine particles can be brought into close contact with the surface of the toner base particle, and can be fixed to the toner base particle yet more firmly. That is, the shell layer preferably contains metal compound fine particles and a condensate of an organosilicon compound.

The condensate also migrates to the surface of the metal compound fine particles, thus rendering the metal compound fine particles hydrophobic, which allows enhancing environmental stability.

As is known, condensation reactions of organosilicon compounds are pH-dependent. Herein pH is preferably from 6.0 to 12.0, in terms of driving condensation forward.

The pH of the aqueous medium or the mixed solution may be adjusted by being controlled using an existing acid or base. Examples of acids for pH adjustment include the following.

Hydrochloric acid, hydrobromic acid, iodic acid, perbromic acid, metaperiodic acid, permanganic acid, thiocyanic acid, sulfuric acid, nitric acid, phosphonic acid, phosphoric acid, diphosphoric acid, hexafluorophosphoric acid, tetrafluoroboric acid, tripolyphosphoric acid, aspartic acid, o-aminobenzoic acid, p-aminobenzoic acid, isonicotinic acid, oxaloacetic acid, citric acid, 2-phosphoglyceric acid, glutamic acid, cyanoacetic acid, oxalic acid, trichloroacetic acid, o-nitrobenzoic acid, nitroacetic acid, picric acid, picolinic acid, pyruvic acid, fumaric acid, fluoroacetic acid, bromoacetic acid, o-bromobenzoic acid, maleic acid and malonic acid.

Preferably among the foregoing an acid is used that exhibits low reactivity with the metal compound, since in that case the metal compound fine particles can be generated with good efficiency.

Examples of bases for pH adjustment include the following.

Alkali metal hydroxides such as potassium hydroxide, sodium hydroxide and lithium hydroxide, and aqueous solutions of the foregoing; alkali metal carbonate salts such as potassium carbonate, sodium carbonate and lithium carbonate, and aqueous solutions of the foregoing; alkali metal sulfate salts such as potassium sulfate, sodium sulfate and lithium sulfate, and aqueous solutions of the foregoing; alkali metal phosphate salts such as potassium phosphate, sodium phosphate and lithium phosphate, and aqueous solutions of the foregoing; alkaline-earth metal hydroxides such as calcium hydroxide and magnesium hydroxide, and aqueous solutions of the foregoing; basic amino acids such as ammonia, histidine, arginine and lysine, and aqueous solutions of the foregoing; and trishydroxymethylaminomethane.

These acids and bases may be used singly, or in combinations of two or more types.

In production method (a) and production method (b), preferably, adhesion of the metal compound fine particles and condensate of the organosilicon compound to the toner base particle is followed by a further condensation reaction of the organosilicon compound. This allows forming a protruded portion of the organosilicon polymer. Also, Hb can be increased, so that Expression (1) is readily satisfied as a result. The condensation method described above can be used as the method for depositing the organosilicon compound that forms the protruded portion.

Methods for measuring various physical property values will be explained next. Method for Calculating the Coverage Ratio of the Shell on the Toner Particle The coverage ratio of the shell containing the metal compound and the organosilicon polymer relative to the toner base particle is calculated by removing the external additive, and the metal compound and organosilicon polymer of weak fixed state, followed by processing of a toner surface image captured using a field emission scanning electron microscope.

Treatment (a) for removing the external additive from the toner particle

A 61.5 mass % aqueous sucrose solution is prepared by adding 160 g of sucrose (Kishida Chemical Co., Ltd.) to 100 mL of deionized water and dissolving while heating on a water bath. 31.0 g of this aqueous sucrose solution and 6.0 g of Contaminon N (product name) (a 10.0 mass % aqueous solution of a neutral pH 7 detergent for cleaning precision measurement instrumentation, comprising a nonionic surfactant, anionic surfactant, and organic builder, Wako Pure Chemical Industries, Ltd.) are introduced into a centrifugal separation tube (50 mL) and a dispersion is prepared.

1.0 g of the toner is added to this dispersion and toner lumps are broken up using, for example, a spatula. The centrifugal separation tube is shaken for 20 minutes at an amplitude of 4 cm at 300 spm (strokes per min) using a shaker (AS-1N from AS ONE Corporation) equipped with a Universal Shaker Option Centrifuge Tube Holder (AS ONE Corporation).

After shaking, the solution is transferred to a glass tube (50 mL) for swing rotor service and separation is performed using a centrifugal separator and conditions of 3500 rpm and 30 minutes. The occurrence of satisfactory separation between the toner and aqueous solution is visually checked, and the toner separated into the uppermost layer is recovered with, for example, a spatula. The recovered toner is filtered on a reduced-pressure filtration apparatus and is then dried for at least 1 hour in a dryer. The dried product is broken up with a spatula to obtain the toner (a).

Treatment (b) for removing the metal compound and organosilicon polymer of weak fixed state from the toner particle 31.0 g of the aforementioned aqueous sucrose solution and 6.0 g of Contaminon N are introduced into a centrifugal separation tube and a dispersion is prepared. To this dispersion is added 1.0 g of toner on which treatment (a) has been carried out, and the toner lumps are broken up with, for example, a spatula. Ultrasound at an electrical output of 120 W is applied for 10 minutes to the centrifugal separation tube using a VP-050 from the TAITEC Corporation.

After the ultrasound treatment, the solution is transferred to a glass tube (50 mL) for swing rotor service and separation is performed using a centrifugal separator and conditions of 3500 rpm and 30 minutes. The occurrence of satisfactory separation between the ultrasound-treated toner and aqueous solution is visually checked, and the toner separated into the uppermost layer is recovered with, for example, a spatula. The recovered toner is filtered on a reduced-pressure filtration apparatus and is then dried for at least 1 hour in a dryer. The dried product is broken up with a spatula to obtain the toner (b).

The coverage ratio of the shell is determined by carrying out analysis with Image-Pro Plus ver. 5.0 image analysis software (Nippon Roper K. K.) on the toner surface image acquired with an S-4800 Hitachi Ultrahigh Resolution Field Emission Scanning Electron Microscope (Hitachi High-Technologies Corporation). The image acquisition conditions with the S-4800 are as follows.

(1) Specimen Preparation

An electroconductive paste is spread in a thin layer on the specimen stub (15 mm×6 mm aluminum specimen stub) and the toner treated by the above treatment (b) is sprayed onto this. Blowing with air is additionally performed to remove excess toner from the specimen stub and carry out thorough drying. The specimen stub is set in the specimen holder and the specimen stub height is adjusted to 36 mm with the specimen height gauge.

(2) Setting of S-4800 Observation Conditions

The coverage ratio is calculated using images obtained through backscattered electron image observation by S-4800. Backscattered electron images exhibit less charge-up of fine particles containing a metal compound, as compared with secondary electron images, and therefore allow for measurements with good precision.

Liquid nitrogen is introduced to the brim of the anti-contamination trap attached to the S-4800 housing and standing for 30 minutes is carried out. The "PC-SEM" of the S-4800 is started and flashing is performed (the FE tip, which is the electron source, is cleaned). The acceleration voltage display area in the control panel on the screen is clicked and the [Flashing] button is pressed to open the flashing execution dialog. A flashing intensity of 2 is confirmed and execution is carried out. The emission current due to flashing is confirmed to be 20 to 40 µA. The specimen holder is inserted in the specimen chamber of the S-4800 housing. [Home] is pressed on the control panel to transfer the specimen holder to the observation position.

The acceleration voltage display area is clicked to open the HV setting dialog and the acceleration voltage is set to [0.8 kV] and the emission current is set to [20 µA]. In the [Base] tab of the operation panel, signal selection is set to [SE], [Upper (U)] and [+BSE] are selected for the SE detector, and the instrument is placed in backscattered electron image observation mode by selecting [L. A. 100] in the selection box to the right of [+BSE]. Similarly, in the [Base] tab of the operation panel, the probe current of the electron optical system condition block is set to [Normal]; the focus mode is set to [UHR]; and WD is set to [3.0 mm]. The [ON] button in the acceleration voltage display area of the control panel is pressed to apply the acceleration voltage.

(3) Calculation of the Number-Average Particle Diameter (D1) of Toner

Magnifications are set to 5000× (5 k) through dragging within the magnification display area of the control panel.

Adjustment of the aperture alignment is carried out when some degree of focus has been obtained by turning the [COARSE] focus knob on the operation panel. Then [Align] in the control panel is clicked and the alignment dialog is displayed and [Beam] is selected. The displayed beam is moved to the center of the concentric circles by turning the STIGMA/ALIGNMENT knobs (X, Y) on the operation panel. [Aperture] is then selected and the STIGMA/ALIGNMENT knobs (X, Y) are turned one at a time and adjustment is performed so as to stop the motion of the image or minimize the motion. The aperture dialog is closed and focus is performed with the autofocus.

This operation is repeated an additional two times to achieve focus.

Thereafter the number-average particle diameter (D1) is worked out through measurement of the particle diameter of 300 toner particles. The particle diameter of each particle is herein a respective largest diameter upon observation of toner having been subjected to the treatment (b).

(4) Focus Adjustment

For particles obtained in (3) and having number-average particle diameter (D1)±0.1 μm, magnifications are set to 10000× (10 k) through dragging within the magnification display area on the control panel, in a state where the midpoint of the largest diameter is matched to the center of the measurement screen. The [COARSE] focus knob on the operation panel is turned, and aperture alignment is adjusted when some degree of focus has been obtained. Then [Align] is clicked in the control panel, the alignment dialog is displayed, and [beam] is selected. The displayed beam is moved to the center of the concentric circles by turning the STIGMA/ALIGNMENT knobs (X, Y) on the operation panel.

[Aperture] is selected and the STIGMA/ALIGNMENT knobs (X, Y) are turned one at a time, to perform an adjustment of stopping the motion of the image or minimizing the motion. The aperture dialog is closed, and focusing is accomplished with the autofocus.

The magnification is then set to 50,000× (50 k), focus adjustment is carried out as above using the focus knob and STIGMA/ALIGNMENT knobs, and focus is again performed with the autofocus. This operation is repeated again to achieve focus. Here, the accuracy of measurement of the coverage ratio readily declines when the plane of observation has a large angle of inclination, and for this reason simultaneous focus of the plane of observation as a whole is selected during focus adjustment and the analysis is carried out with selection of the smallest possible surface inclination.

(5) Image Storage

Brightness adjustment is performed using the ABC mode, and a photograph with a size of 640×480 pixels is taken and saved. Analysis is carried out as follows using this image file. One photograph is taken per one toner particle, and images are obtained for at least 30 or more toner particles.

(6) Image Analysis

The coverage ratio is determined by carrying out binarization, using the analytic software described below, of the image yielded by the aforementioned procedure. Here, the single screen described above is partitioned into 12 squares and each is analyzed. The analysis conditions with the Image-Pro Plus ver. 5.1J image analysis software (Media Cybernetic, Inc.) are as follows.

Image-Pro Plus 5.1J Software

"Count/Size" and then "Options" are selected from "Measure" in the toolbar and the binarization conditions are set. 8-Connect is selected in the object extraction option and smoothing is set to 0. In addition, pre-filter, hole filling, and enclosure line are not selected, and "Clean Borders" is set to "None". "Select Measurements" is selected from "Measure" in the toolbar, and 2 to $10^7$ is input into Area of Filter Ranges.

The coverage ratio is calculated through analysis by enclosing a square region. The area (C) of the region is set herein to be 24000 to 26000 pixels. A sum total (D) of area of regions in which the shell is absent is calculated through automatic binarization, in "Processing"-binarization.

A coverage ratio a is then worked out according to the expression below on the basis of the area C of the square region and the sum total D of area of the shell-free region.

Coverage ratio a (%)=100− ((D/C)×100)

As described above, the calculation of the coverage ratio a is carried out for 30 or more toner particles subjected to the treatment (b). The average value of all the obtained data is taken as the coverage ratio.

Method for Calculating the Fixing Ratio of the Shell on the Toner Particle

The amount of metal and silicon derived from the metal compound and the organosilicon polymer included in the toner particle, before and after execution of the treatment (b), is determined using an X-ray fluorescence analyzer.

Calculation of the detected intensity of metal in the metal compound and silicon in the organosilicon polymer, contained in the toner particle The detected intensity of the metal and silicon in the toner particle is measured in accordance with the following method.

A wavelength-dispersive X-ray fluorescence analyzer "Axios" (by PANalytical B.V.) is used for measuring the detected intensity of the metal and silicon in the toner particle, and the ancillary dedicated software "SuperQ ver. 4.0F" (by PANalytical B.V.) is used for setting measurement conditions and analyzing measurement data.

Rhodium (Rh) is used as the anode of the X-ray tube, in a vacuum atmosphere, and with the measurement diameter (collimator mask diameter) set to 27 mm, and measurement time set to 10 seconds.

A proportional counter (PC) is used for measuring light-weight elements, and a scintillation counter (SC) is used for measuring heavy elements.

As a measurement sample, 4 g of the toner after execution of the treatment (b) are placed in a dedicated aluminum ring for pressing, and the toner is evened out. This is followed by pressing at 20 MPa for 60 seconds, using a tablet molding compressor "BRE-32" (by Maekawa Testing Machine Mfg. Co., Ltd.); to yield pellets compacted to a thickness of 2 mm and diameter of 39 mm. The above operation is carried out, to form pellets, also for toner prior to execution of the treatment (b).

The detected intensity (units: cps) of the metal and silicon observed at a diffraction angle (2θ) of =109.08°, using pentaerythritol (PET) as an analyzing crystal, is measured herein for each sample. The acceleration voltage and current value of the X-ray generation device are set herein to 24 kV and 100 mA, respectively.

In the fluorescent X-ray analysis, M1 (detected intensity kcps) is defined as the amount of metal contained in the metal compound and Si1 (detected intensity kcps) as the amount of silicon contained in the organosilicon polymer, in the toner, after execution of the treatment (a) and prior to execution of the treatment (b). Further, M2 (detected intensity kcps) is defined as the amount of metal contained in the metal compound and Si2 (detected intensity kcps) as the amount of silicon contained in the organosilicon polymer, in the toner, after execution of the treatment (b).

Fixing ratio of the metal compound =M2/M1

Fixing ratio of the organosilicon polymer =Si2/Si1

The fact that the component released in the treatment (b) is an organosilicon polymer can be verified in accordance with the method below.

Identification of the Structure of the Organosilicon Polymer by NMR

In a case for instance where the organosilicon polymer has a structure represented by Formula (I) above, the hydrocarbon group represented by R in Formula (I) is ascertained by $^{13}$C-NMR.

($^{13}$C-NMR (solid) measurement conditions)

Apparatus: JEOL RESONANCE, JNM-ECX500II
Sample tube: 3.2 mmØ
Sample: 150 mg of tetrahydrofuran insoluble fraction of component liberated in the treatment (b)
Measurement temperature: room temperature
Pulse mode: CP/MAS
Measurement nuclear frequency: 123.25 MHz($^{13}$C)
Reference substance: adamantane (external standard: 29.5 ppm)
Sample rotational speed: 20 kHz
Contact time: 2 ms
Delay time: 2 s
Total count: 1024 times In the above method it can be verified that the liberated component is the organosilicon polymer represented by R in Formula (I) on the basis of the presence or absence of signals derived for instance from a methyl group (Si—CH$_3$), ethyl group (Si—C$_2$H$_5$), propyl group (Si—C$_3$H$_7$), butyl group (Si—C$_4$H$_9$), pentyl group (Si—C$_5$H$_{11}$), hexyl group (Si—C$_6$H$_{13}$) or phenyl group (Si—C$_6$H$_5$) bonded to a silicon atom.

Method for Measuring the Average Distance Ha from the Interface of the Base Particle and the Shell Up to the Toner Particle Surface, in the Exposed Portion of the Metal Compound, and the Average Distance Hb from the Interface of the Base Particle and the Shell Up to the Toner Particle Surface, in the Exposed Portion of the Organosilicon Polymer A cross section of a toner particle is observed in accordance with the method below, using a transmission electron microscope (TEM). Firstly the toner is thoroughly dispersed in an epoxy resin that is curable at normal temperature, followed by curing for 2 days in an atmosphere at 40° C. A flake-like sample having a thickness of 100 nm is cut out of the obtained cured product using a microtome equipped with a diamond blade. This sample is magnified at 100000 magnifications using a TEM (product name: electron microscope Tecnai TF20XT, by FEI), and a cross section of the toner particle is observed. The toner particle cross section selected herein has a major axis diameter that is 0.9 to 1.1 times the number-average particle diameter (D1) of the same toner, measured in accordance with the below-described method for measuring the number-average particle diameter (D1) of a toner particle.

Next the constituent elements of the obtained cross section of the toner particle are analyzed by energy-dispersive X-ray spectroscopy (EDX), to generate an EDX mapping image. FIG. 1 illustrates an example of a mapping image by TEM-EDX. The reference symbols in FIG. 1 are as follows. 10: toner base particle, 11: organosilicon polymer, 12: metal compound, a: example of distance from the interface of the toner base particle and the shell up to the toner particle surface, at the exposed portion of the metal compound, b: example of distance from the interface of the toner base particle and the shell up to the toner particle surface, at the exposed portion of the organosilicon polymer.

Signals derived from the constituent elements of the metal compound and the organosilicon polymer are checked on the contour of the cross section of the toner particle in the EDX mapping image, to ascertain the presence or absence of a shell having the signal of the metal compound and the signal of the organosilicon polymer. It suffices that the shell covers the surface of the toner base particle. The shell need not cover the entirety of the surface of the toner base particle, and there may be portions at which the toner base particle is exposed. For instance, a shell is present that has the above signal over preferably 70% or more, yet more preferably 80% or more, of the perimeter of the cross section of the toner base particle, in the cross section observation.

Upon observation of a signal of the metal compound and a signal of the organosilicon polymer on the surface of the toner particle (cross section contour), Ha and Hb are then calculated taking the foregoing signals as the metal compound exposed portion and the exposed portion of the organosilicon polymer.

Cross sections of 50 toner particles are observed in accordance with the above method, and exposed portions of the metal compound on the toner particle surface are checked. Herein there is measured the distance from the interface of the base particle and the shell, at the exposed portion, up to the toner particle surface (exposed portion surface). The normal-direction distances from the interface of the toner base particle and the shell are measured at an exposed portion exhibiting independent signals, and the maximum length is selected. In a case where multiple independent exposed portions are observed, all the exposed portions are measured. An arithmetic mean value of the 50 toner particle cross sections is then taken as Ha (nm).

Cross sections of 50 toner particles are observed in the same way as for Ha, and there is calculated the average distance Hb (nm) from the interface of the base particle and the shell up to the toner particle surface, at the exposed portion of the organosilicon polymer.

Method for Measuring Weight-average Particle Diameter (D4) and Number-average Particle Diameter (D1)

The weight-average particle diameter (D4) and number-average particle diameter (D1) of the toner, toner particle, and toner base particle (also referred to below as, for example, toner) is determined proceeding as follows.

The measurement instrument used is a "Coulter Counter Multisizer 3" (registered trademark, Beckman Coulter, Inc.), a precision particle size distribution measurement instrument operating on the pore electrical resistance method and equipped with a 100-μm aperture tube.

The measurement conditions are set and the measurement data are analyzed using the accompanying dedicated software, i.e., "Beckman Coulter Multisizer 3 Version 3.51" (Beckman Coulter, Inc.). The measurements are carried out in 25,000 channels for the number of effective measurement channels.

The aqueous electrolyte solution used for the measurements is prepared by dissolving special-grade sodium chloride in deionized water to provide a concentration of 1.0% and, for example, "ISOTON II" (Beckman Coulter, Inc.) can be used.

The dedicated software is configured as follows prior to measurement and analysis.

In the "modify the standard operating method (SOMME)" screen in the dedicated software, the total count number in the control mode is set to 50,000 particles; the number of measurements is set to 1 time; and the Kd value is set to the value obtained using "standard particle 10.0 μm" (Beckman Coulter, Inc.). The threshold value and noise level are automatically set by pressing the "threshold value/noise level measurement button". In addition, the current is set to 1,600 µA; the gain is set to 2; the electrolyte solution is set to ISOTON II; and a check is entered for the "post-measurement aperture tube flush".

In the "setting conversion from pulses to particle diameter" screen of the dedicated software, the bin interval is set to logarithmic particle diameter; the particle diameter bin is set to 256 particle diameter bins; and the particle diameter range is set to 2 µm to 60 µm.

The Specific Measurement Procedure is as Follows.

(1) 200.0 mL of the aqueous electrolyte solution is introduced into a 250-mL roundbottom glass beaker intended for use with the Multisizer 3 and this is placed in the sample stand and counterclockwise stirring with the stirrer rod is carried out at 24 rotations per second. Contamination and air bubbles within the aperture tube are preliminarily removed by the "aperture tube flush" function of the dedicated software.

(2) 30.0 mL of the aqueous electrolyte solution is introduced into a 100-mL flatbottom glass beaker. To this is added as dispersing agent 0.3 mL of a dilution prepared by the three-fold (mass) dilution with deionized water of "Contaminon N" (a 10% aqueous solution of a neutral pH 7 detergent for cleaning precision measurement instrumentation, comprising a nonionic surfactant, anionic surfactant, and organic builder, from Wako Pure Chemical Industries, Ltd.).

(3) An "Ultrasonic Dispersion System Tetra 150" (Nikkaki Bios Co., Ltd.) is prepared; this is an ultrasound disperser with an electrical output of 120 W and is equipped with two oscillators (oscillation frequency=50 kHz) disposed such that the phases are displaced by 180°. 3.3 L of deionized water is introduced into the water tank of the ultrasound disperser and 2.0 mL of Contaminon N is added to this water tank.

(4) The beaker described in (2) is set into the beaker holder opening on the ultrasound disperser and the ultrasound disperser is started. The vertical position of the beaker is adjusted in such a manner that the resonance condition of the surface of the aqueous electrolyte solution within the beaker is at a maximum.

(5) While the aqueous electrolyte solution within the beaker set up according to (4) is being irradiated with ultrasound, 10 mg of the, e.g., toner, is added to the aqueous electrolyte solution in small aliquots and dispersion is carried out. The ultrasound dispersion treatment is continued for an additional 60 seconds. The water temperature in the water tank is controlled as appropriate during ultrasound dispersion to be from 10° C. to 40° C.

(6) Using a pipette, the aqueous electrolyte solution prepared in (5) and containing, e.g., dispersed toner, is dripped into the roundbottom beaker set in the sample stand as described in (1) with adjustment to provide a measurement concentration of 5%. Measurement is then performed until the number of measured particles reaches 50,000.

(7) The measurement data is analyzed by the previously cited dedicated software provided with the instrument and the weight-average particle diameter (D4) and the number-average particle diameter (D1) are calculated. When set to graph/volume % with the dedicated software, the "average diameter" on the "analysis/volumetric statistical value (arithmetic average)" screen is the weight-average particle diameter (D4). When set to graph/number % with the dedicated software, the "average diameter" on the "analysis/numerical statistical value (arithmetic average)" screen is the number-average particle diameter (D1).

Measurement of the Volume Resistivity of Fine Particles

The volume resistivity of the metal compound fine particles is measured as follows.

A Model 6430 Sub-Femtoamp Remote SourceMeter (Keithley Instruments) is used as the instrumentation. An SH2-Z 4-probe measurement-enabling sample holder (Bio-Logic) is connected to the FORCE terminal of this instrument; 0.20 g of the metal compound is loaded in the electrode section; and the distance between the electrodes is measured with a load of 123.7 kgf applied using a torque wrench.

The resistance is measured after the application of a voltage of 20 V for 1 minute to the sample, and the volume resistivity is calculated using the following formula.

$$\text{Volume resistivity } (\Omega \cdot cm) = R \times S/L$$

(R: resistance value (Ω), L: distance between electrodes (cm), S: electrode area (cm$^2$))

Method for Measuring Glass Transition Temperature (Tg)

The glass transition temperature (Tg) of for instance a toner base particle or resin is measured according to ASTM D3418-82, using a differential scanning calorimeter "Q1000" (by TA Instruments Inc.).

The melting points of indium and zinc are used to correct the temperature of the device detection unit, and the heat of fusion of indium is used to correct the amount of heat.

Specifically, 10 mg of sample are weighed exactly, and the sample is placed on an aluminum pan; a measurement is carried out then using an empty aluminum pan as a reference, within a measurement temperature range from 30° C. to 200° C., at a ramp rate of 10° C./min.

In the measurement, the temperature is raised once to 200° C., then the temperature is lowered down to 30° C. at a ramp down rate of 10° C./min, after which the temperature is raised again.

In the second temperature rise process, a specific heat change is obtained in a temperature range from 40° C. to 100° C. The intersection between the line at the midpoint of the baseline and the differential heat curve, before and after the change in specific heat at that time, is taken herein as the glass transition temperature (Tg).

EXAMPLES

The present invention is more specifically described in the examples provided below. However, these in no way limit the present invention. Unless specifically indicated otherwise, the "parts" and "%" in the formulations in the examples and comparative examples are on a mass basis in all instances.

<Production Example of an Organosilicon Compound Solution>

| Ion-exchanged water | 80.0 parts |
|---|---|
| Methyltriethoxysilane | 20.0 parts |

The above materials were weighed in a 200 mL beaker and pH was adjusted to 3.5 using 10% hydrochloric acid. Thereafter the mixture was stirred for 1.0 hour while under heating at 60° C. in a water bath, to produce Organosilicon compound solution 1. The type of the organosilicon compound was modified as given in Table 1, to produce Organosilicon compound solutions 2 and 3.

TABLE 1

| | Compound name | Abbreviation |
|---|---|---|
| Organosilicon compound solution 1 | Methyltriethoxysilane | MTES |
| Organosilicon compound solution 2 | Vinyltriethoxysilane | VTES |
| Organosilicon compound solution 3 | Tetraethoxysilane | TEOS |

Production Example of Toner Base Particle Dispersion 1

14.0 parts of sodium phosphate (dodecahydrate) was introduced into 390.0 parts of deionized water in a reactor and the temperature was held at 65° C. for 1.0 hour while purging with nitrogen. Stirring was begun at 12000 rpm using a T. K. Homomixer (Tokushu Kika Kogyo Co., Ltd.). While maintaining the stirring, an aqueous calcium chloride solution of 9.2 parts of calcium chloride (dihydrate) dissolved in 10.0 parts of deionized water was introduced all at once into the reactor to prepare an aqueous medium containing a dispersion stabilizer. 1.0 mol/L hydrochloric acid was introduced into the aqueous medium in the reactor to adjust the pH to 6.0, thus yielding aqueous medium 1.

Preparation of Polymerizable Monomer Composition

| styrene | 60.0 parts |
|---|---|
| C.I. Pigment Blue 15:3 | 6.3 parts |

These materials were introduced into an attritor (Nippon Coke & Engineering Co., Ltd.) and dispersion was carried out for 5.0 hours at 220 rpm using zirconia particles with a diameter of 1.7 mm to prepare a colorant dispersion in which the pigment was dispersed.

The following materials were then added to this colorant dispersion.

| styrene | 15.0 parts |
|---|---|
| n-butyl acrylate | 25.0 parts |
| polyester resin (condensation polymer of terephthalic acid and the 2 mol adduct of propylene oxide on bisphenol A, weight-average molecular weight Mw = 10000) | 5.0 parts |
| HNP9 (melting point: 76° C., Nippon Seiro Co., Ltd.) | 6.0 parts |

This material was then held at 65° C. and a polymerizable monomer composition was prepared by dissolving and dispersing to uniformity at 500 rpm using a T. K. Homomixer.

Granulation Step

While holding the temperature of aqueous medium 1 at 70° C. and the stirrer rotation rate at 12500 rpm, the polymerizable monomer composition was introduced into the aqueous medium 1 and 8.0 parts of the polymerization initiator t-butyl peroxypivalate was added. Granulation was performed for 10 minutes while maintaining 12500 rpm with the stirrer.

Polymerization Step

The high-speed stirrer was replaced with a stirrer equipped with a propeller impeller and polymerization was carried out for 5.0 hours while maintaining 70° C. and stirring at 200 rpm; the temperature was then raised to 85° C. and a polymerization reaction was run by heating for 2.0 hours. A deionized water was added to adjust the toner base particle concentration in the dispersion to 20.0 mass %, thus yielding toner base particle dispersion 1 in which toner base particle 1 was dispersed.

Toner base particle 1 had a number-average particle diameter (D1) of 5.6 μm, a weight-average particle diameter (D4) of 6.3 μm and Tg of 56° C.

Production Example of Toner Base Particle Dispersion 2

The following materials were mixed in a reaction vessel equipped with a cooling tube, a stirrer and a nitrogen introducing tube.

| Terephthalic acid | 25.0 parts |
|---|---|
| Polyoxy propylene(2.2)-2,2-bis (4-hydroxyphenyl)propane | 78.0 parts |
| Titaniumdihydroxybis (triethanolaminate) | 0.1 parts |

Thereafter the mixture was heated at 210° C. and was allowed to react for 6 hours while under introduction of nitrogen and removal of the produced water. Further, 5.8 parts of trimellitic anhydride were added, with heating at 180° C., to synthesize Polyester resin 1 after 3 hours of reaction. The weight-average molecular weight Mw was 18300.

Next, the following materials were charged in an autoclave, the in the interior of the system was purged with nitrogen, and the temperature was raised and held at 180° C. while under stirring.

| Low density polyethylene (melting point 100° C.) | 20.0 parts |
|---|---|
| Styrene | 62.0 parts |
| n-butyl acrylate | 16.0 parts |

Next, 50.0 parts of a 2.0% xylene solution of t-butyl hydroperoxide were continuously added dropwise into the system over 4.5 hours, and the solvent after cooling was separated and removed, to yield a graft polymer 1 in which a styrene acrylic copolymer was grafted on polyethylene. The weight-average molecular weight Mw was 38500.

The following materials were thoroughly mixed in an FM mixer (by Nippon Coke & Engineering Co., Ltd.), followed by melt-kneading in a twin-screw kneader (by Ikegai Corporation) set to a temperature of 100° C.

| Polyester resin 1 | 100.0 parts |
|---|---|
| HNP9 (melting point: 76° C., by Nippon Seiro Co., Ltd.) | 6.0 parts |
| Graft polymer 1 | 5.0 parts |
| C.I. Pigment Blue 15:3 | 6.3 parts |

The obtained kneaded product was cooled, and was coarsely pulverized to 1 mm or less using a hammer mill, to yield a coarsely pulverized material.

The obtained coarsely pulverized material was made into a finely pulverized material of about 5 μm using a Turbo mill by Turbo Kogyo Co., Ltd. The powder was further cut using a multi-grade classifier relying on the Coanda effect, to yield Toner base particle 2.

The number-average particle diameter (D1) of Toner base particle 2 was 5.2 μm, the weight-average particle diameter (D4) was 6.7 μm, and Tg was 57° C.

Herein 14.0 parts of sodium phosphate (12 hydrate) were charged into a reaction vessel that held 390.0 parts of ion-exchanged water, and the vessel was warmed at 65° C. for 1.0 hour while being purged with nitrogen.

The whole was stirred at 12500 rpm using a T. K. Homomixer (by Tokushu Kika Kogyo Co., Ltd.). An aqueous solution of calcium chloride resulting from dissolving 9.2 parts of calcium chloride (dihydrate) in 10.0 parts of ion-exchanged water was charged all at once, while under stirring, into the reaction vessel, to prepare an aqueous medium containing a dispersion stabilizer. Further, 1.0 mol/L hydrochloric acid was charged into the aqueous medium within the reaction vessel, to adjust pH to 6.0, and prepare Aqueous medium 2.

Then 200.0 parts of Toner base particle 2 were charged into Aqueous medium 2, with dispersion for 30 minutes while under rotation at 5000 rpm, using T. K. Homomixer, at a temperature of 60° C. The toner particle concentration in the dispersion was adjusted to 20.0% through addition of ion-exchanged water, to yield Toner base particle dispersion 2.

Production Example of Toner Base Particle Dispersion 3

The following materials were weighed, mixed and dissolved.

| | |
|---|---|
| styrene | 82.6 parts |
| n-butyl acrylate | 12.4 parts |
| acrylic acid | 1.3 parts |
| hexanediol diacrylate | 0.4 parts |
| n-lauryl mercaptan | 3.2 parts |

A 10% aqueous solution of Neogen RK (Dai-ichi Kogyo Seiyaku Co., Ltd.) was added to this solution and dispersion was carried out. While gently stirring for 10 minutes, an aqueous solution of 0.15 parts of potassium persulfate dissolved in 10.0 parts of deionized water was also added.

Nitrogen substitution was performed followed by emulsion polymerization for 6.0 hours at a temperature of 70° C. After completion of the polymerization, the reaction solution was cooled to room temperature and deionized water was added to obtain a resin particle dispersion having a solids concentration of 12.5% and a number-average particle diameter of 0.2 μm.

The following materials were weighed out and mixed.

| | |
|---|---|
| ester wax (melting point: 70° C.) | 100.0 parts |
| Neogen RK | 17.0 parts |
| deionized water | 385.0 parts |

A wax particle dispersion was obtained by dispersion for 1 hour using a JN100 wet jet mill (Jokoh Co., Ltd.). The solids concentration in this wax particle dispersion was 20.0%.

The following materials were weighed out and mixed.

| | |
|---|---|
| C.I. Pigment Blue 15:3 | 63.0 parts |
| Neogen RK | 17.0 parts |
| deionized water | 920.0 parts |

A colorant particle dispersion was obtained by dispersion for 1 hour using a JN100 wet jet mill (Jokoh Co., Ltd.). The solids concentration in this colorant particle dispersion was 10.0%.

| | |
|---|---|
| resin particle dispersion | 160.0 parts |
| wax particle dispersion | 10.0 parts |
| colorant particle dispersion | 18.9 parts |
| magnesium sulfate | 0.3 parts |

These materials were dispersed using a homogenizer (IKA), followed by heating to 65° C. while stirring. After stirring for 1.0 hour at 65° C., observation with an optical microscope confirmed the formation of aggregate particles having a number-average particle diameter of 6.0 μm. After the addition of 2.5 parts of Neogen RK (Dai-ichi Kogyo Seiyaku Co., Ltd.), the temperature was raised to 80° C. and stirring was performed for 2.0 hours to obtain coalesced colored resin particles.

The solid obtained by cooling and then filtration and separation was washed by stirring for 1.0 hour in 720.0 parts of deionized water. This colored resin-containing dispersion was filtered followed by drying to yield toner base particle 3.

Toner base particle 3 had a number-average particle diameter (D1) of 6.2 μm, a weight-average particle diameter (D4) of 7.5 μm, and Tg of 56° C.

14.0 parts of sodium phosphate (dodecahydrate) was introduced into 390.0 parts of deionized water in a reactor, and this was held for 1.0 hour at 65° C. while purging with nitrogen.

An aqueous calcium chloride solution of 9.2 parts of calcium chloride (dihydrate) dissolved in 10.0 parts of deionized water was introduced all at once while stirring at 12500 rpm using a T. K. Homomixer (Tokushu Kika Kogyo Co., Ltd.) to prepare an aqueous medium containing a dispersion stabilizer. 1.0 mol/L hydrochloric acid was introduced into the aqueous medium in the reactor to adjust the pH to 6.0 and provide aqueous medium 3.

100.0 parts of toner base particle 3 was introduced into aqueous medium 3 and dispersion was carried out for 30 minutes while stirring at 5000 rpm and a temperature of 60° C. using a T. K. Homomixer. Deionized water was added to adjust the solids concentration of toner base particle 3 in the dispersion to 20.0%, thus providing toner base particle dispersion 3.

Production Example of Toner Base Particle Dispersion 4

Herein 660.0 parts of ion-exchanged water and 25.0 parts of a 48.5% aqueous solution of sodium dodecyldiphenyl ether disulfonate were mixed and stirred, and an aqueous medium was produced through stirring at 10000 rpm using a T. K. Homomixer (by Tokushu Kika Kogyo Co., Ltd.).

The following materials were added to 500.0 parts of ethyl acetate, with dissolution at 100 rpm using a propeller-type stirring device, to prepare a solution

| | |
|---|---|
| Styrene/butylacrylate copolymer (copolymerization mass ratio: 80/20, weight-average molecular weight Mw = 24000) | 100.0 parts |
| Polyester resin (condensation polymer of terephthalic acid and 2-mol propylene oxide adduct of bisphenol A; weight-average molecular weight Mw = 10000) | 5.0 parts |
| C.I. Pigment Blue 15:3 | 6.3 parts |
| HNP9 (melting point 76° C., by Nippon Seiro Co., Ltd.) | 9.0 parts |

Then 150.0 parts of the above aqueous medium were charged into a vessel, and were stirred at 12500 rpm using T. K. Homomixer, with further addition of 100.0 parts of the above solution were added, and mixing for 10 minutes, to prepare an emulsified slurry.

Thereafter, 100.0 parts of the emulsified slurry were charged into a flask fitted with a degassing pipe, a stirrer and a thermometer, and the solvent was removed under reduced pressure at 30° C. for 12 hours while under stirring at a stirring peripheral speed of 20 m/min, followed by aging at 45° C. for 4 hours, to yield a solvent-free slurry.

The solvent-free slurry was warm-filtered, and thereafter 300.0 parts of ion-exchanged water were added to the obtained filter cake, with mixing and redispersion (rotational speed of 12500 rpm, for 10 minutes) in a T. K. Homomixer, followed by filtration.

The obtained filter cake was dried at 40° C. for 48 hours in a dryer, and was sifted using a sieve having a mesh opening of 75 μm, to yield Toner base particle 4.

The number-average particle diameter (D1) of Toner base particle 4 was 5.7 μm, the weight-average particle diameter (D4) was 7.2 μm, and Tg was 57° C.

Herein 14.0 parts of sodium phosphate (12 hydrate) were charged into a reaction vessel that held 390.0 parts of ion-exchanged water, and the vessel was warmed at 65° C. for 1.0 hour while being purged with nitrogen.

An aqueous solution of calcium chloride resulting from dissolving 9.2 parts of calcium chloride (dihydrate) in 10.0 parts of ion-exchanged water was charged all at once, while under stirring at 12500 rpm using a T. K. Homomixer, into the reaction vessel, to prepare an aqueous medium containing a dispersion stabilizer. Further 1.0 mol/L hydrochloric acid was charged into the aqueous medium within the reaction vessel, and pH was adjusted to 6.0, to prepare Aqueous medium 4.

Then 100.0 parts of Toner base particle 4 were added to Aqueous medium 4, and were dispersed for 30 minutes while under rotation at 5000 rpm, using T. K. Homomixer, at a temperature of 60° C. The solids concentration of Toner base particle 4 in the dispersion was adjusted to 20.0% through addition of ion-exchanged water, to yield Toner base particle dispersion 4.

Production Example of a Toner Particle

Toner Particle 1

Step of Depositing a Metal Compound

The samples below were weighed in a reaction vessel and were mixed using a propeller stirring blade.

| | |
|---|---|
| Toner base particle dispersion 1 | 500.0 parts |
| Organosilicon compound solution 1 | 11.0 parts |
| 44% aqueous solution of titanium lactate (TC-310 by Matsumoto Fine Chemical Co., Ltd.) | 2.96 parts (1.30 parts equivalent as titanium lactate) |

Next, the pH of the obtained mixed solution was adjusted to 7.0 using a 1 mol/L NaOH aqueous solution, and the temperature of the mixed solution was brought to 50° C., after which the temperature was held for 1.0 hour while under mixing using a propeller stirring blade. The pH was thereafter adjusted to 9.5 using a 1 mol/L NaOH aqueous solution, and the temperature was held at 50° C. for 2.0 hours while under stirring.

Step of Adding an Organosilicon Compound

Herein 1.0 mol/L hydrochloric acid was added while under stirring using a propeller stirring blade, to adjust the pH of the mixed solution to 7.0. The sample below was weighed in a reaction vessel, was mixed, and was thereafter held for 1.0 hour.

| | |
|---|---|
| Organosilicon compound solution 1 | 25.0 parts |

Then pH was adjusted to 9.5 with a 1 mol/L NaOH aqueous solution, and a temperature of 50° C. was held for 2.0 hours while under stirring. After the temperature was lowered to 25° C., pH was adjusted to 1.5 using 1 mol/L hydrochloric acid, with stirring for 1.0 hour, followed by filtration while under washing with ion-exchanged water, to thereby obtain Toner particle 1 having, on the surface, exposed portions of a titanium phosphate compound and an organosilicon polymer.

The titanium phosphate compound is a reaction product of titanium lactate and phosphate ions derived from sodium phosphate or calcium phosphate in Aqueous medium 1.

Toner Particles 2 to 14, 16 to 19 and 23

Toner particles 2 to 14, 16 to 19, 23 were produced in the same way as Toner particle 1, but by modifying herein the type and amount of the metal source, the type and amount of the organosilicon compound, and the reaction temperature, in the manner set out in Table 2.

Toner Particle 15

Step of Depositing a Metal Compound

The samples below were weighed in a reaction vessel and were mixed using a propeller stirring blade.

| | |
|---|---|
| Toner base particle dispersion 1 | 500.0 parts |
| Organosilicon compound solution 1 | 10.0 parts |
| Aluminum lactate | 1.30 parts |

Next, the pH of the obtained mixed solution was adjusted to 7.0 using a 1 mol/L NaOH aqueous solution, and the temperature of the mixed solution was brought to 50° C., the temperature being thereafter held for 1.0 hour while under mixing using a propeller stirring blade. The pH was subsequently adjusted to 9.5 using a 1 mol/L NaOH aqueous solution, and the temperature was held at 50° C. for 2.0 hours while under stirring.

Step of Adding an Organosilicon Compound

Herein 1.0 mol/L hydrochloric acid was added while under stirring using a propeller stirring blade, to adjust the pH of the mixed solution to 7.0. The sample below was weighed in a reaction vessel, was mixed, and was thereafter held for 1.0 hour.

| | |
|---|---|
| Organosilicon compound solution 1 | 35.0 parts |

The pH was subsequently adjusted to 9.5 using a 1 mol/L NaOH aqueous solution, and the temperature was held at 50° C. for 2.0 hours while under stirring. After the temperature was lowered to 25° C., pH was adjusted to 1.5 using 1 mol/L hydrochloric acid, with stirring for 1.0 hour, followed by filtration while under washing with ion-exchanged water, to thereby obtain Toner particle 15 having, on the surface, exposed portions of a titanium phosphate compound and an organosilicon polymer.

Toner Particle 20

Toner base particle 3 was used as it was, as Toner particle 20.

Toner Particle 21

Herein 500.0 parts of Toner base particle dispersion 3 were adjusted to a temperature of 25° C. while under stirring.

Next, a mixed solution resulting from mixing 5.00 parts of isopropyltriisostearoyl titanate (titanate coupling agent) with 20.0 parts of methanol was added dropwise at a rate of 5 mL/min, and stirring was continued in this manner for 2.0 hours. Then, the temperature was raised to 60° C. while under stirring, and stirring was continued for a further 2.0 hours while holding the temperature at 60° C.

This was followed by cooling down to 25° C., and solid-liquid separation by suction filtration. Vacuum drying was continued next for 12 hours, to obtain Toner particle 21 the surface of which was covered with a titanate coupling agent.

Toner Particle 22

Herein the pH of 500.0 parts of Toner base particle dispersion 3 was adjusted to 1.5 using 1 mol/L hydrochloric acid, while under stirring, whereupon the dispersion was stirred for 1.0 hours at 25° C.

This was followed by filtration while under washing using ion-exchanged water, to yield Toner base particle A.

The materials below were weighed in a reaction vessel and mixed using a propeller stirring blade.

| Methanol | 590.0 parts |
|---|---|
| Toner base particle A | 100.0 parts |

The materials below were added, with further mixing.

| Tetraethoxysilane | 50.0 parts |
|---|---|
| Tetraethoxy titanium | 50.0 parts |
| Methyltriethoxysilane | 30.0 parts |
| Methanol | 400.0 parts |

Next, the dispersion was added dropwise to a mixed solution of 1000.0 parts of a 28% aqueous solution of ammonium hydroxide and 10000.0 parts of methanol, with stirring for 48 hours at room temperature. This was followed by filtration while under washing using purified water, and further washing with methanol, to yield Toner particle 22.

Production Example of Toner 1

Toner particle 1 was used, as it was, as Toner 1.

Toner 1 was observed by TEM-EDX, which revealed that the toner particle had a shell containing a titanium compound and an organosilicon polymer. The exposed portion of the titanium compound and the exposed portion of the organosilicon polymer on the toner particle surface were observed.

The average distance Ha was 15.5 nm, and the average distance Hb was 85.6 nm, as calculated on the basis of an observation image; thus Ha+20.0<Hb was satisfied.

Results of phosphorus mapping revealed that phosphorus was present in the vicinity of titanium, and that a titanium phosphate compound had been generated. The coverage ratio of the shell after the treatment (a) and the treatment (b) was 90.0 area %, and the fixing ratio, i.e. M2/M1 for the titanium phosphate compound, and Si2/Si1 for the organosilicon polymer, were both 0.99.

Toners 2 to 19, 22 to 23

Toner particles 2 to 19, 22 to 23 were used, as they were, as Toners 2 to 19, 22 to 23. Table 3 sets out the physical properties of the toners.

Toner 22 was observed by TEM-EDX, which revealed that the toner particle had a shell containing a titanium compound and an organosilicon polymer. The exposed portion of the titanium compound and the exposed portion of the organosilicon polymer on the toner particle surface were observed.

The average distance Ha was 40.3 nm, and the average distance Hb was 32.6 nm, as calculated on the basis of an observation image, and there were observed numerous fine particles floating off the toner particle. The results of element mapping showed no phosphorus in the vicinity of titanium, i.e. no titanium phosphate compound was generated.

Toner 20

The external additives below were added to 100 parts of Toner particle 20, with mixing in an FM mixer (by Nippon Coke & Engineering Co., Ltd.) at a peripheral speed of 32 m/s for 10 minutes, followed by removal of coarse particles using a mesh with a 45 μm opening, to yield Toner 20.

| Small-diameter hydrophobic silica having a volume average diameter of 12 nm | 0.8 parts |
|---|---|
| Large-diameter hydrophobic silica having a volume average diameter of 40 nm | 0.5 parts |
| Fine particles of rutile/anatase-type titanium oxide (hydrophobicity 56%; specific surface area 155 m$^2$/g), resulting from a hydrophobic treatment using a silane coupling agent, with a mixing ratio of 10 mass % of rutile type and 90 mass % of anatase type | 1.0 part |

Toner 21

The external additives below were added to 100 parts of Toner particle 21, with mixing in an FM mixer (by Nippon Coke & Engineering Co., Ltd.) at a peripheral speed of 32 m/s for 10 minutes, followed by removal of coarse particles using a mesh with a 45 μm opening, to yield Toner 21.

| Hydrophobic titania having a volume-average particle diameter of 15 nm and treated with decylsilane | 0.8 parts |
|---|---|
| Hydrophobic silica (NY50 by Nippon Aerosil Co., Ltd.) having a volume-average particle diameter of 30 nm | 1.1 parts |
| Hydrophobic silica having a volume-average particle diameter of 100 nm (X-24: by Shin-Etsu Chemical Co., Ltd.) | 1.0 part |

Toner 21 was observed by TEM, which revealed that the toner particle was covered with a thin film.

The above thin film was observed to be a thin film derived from titanium, in EDX mapping images of the constituent elements of a cross section of the toner particle. The thickness of the thin film, calculated on the basis of the observation images, was 14.7 nm. No phosphorus was observed in the vicinity of titanium, i.e. no titanium phosphate compound was generated.

TABLE 2

| Toner No. | Toner particle No. | Toner base particle dispersion No. | Metal compound deposition step | | | Organosilicon compound addition step | | |
|---|---|---|---|---|---|---|---|---|
| | | | Metal source | | | Organosilicon compound | | Reaction temperature (° C.) |
| | | | Type | Parts | Organosilicon compound Type | Parts | Reaction temperature (° C.) | Type | Parts |

| Toner No. | Toner particle No. | Toner base particle dispersion No. | Type | Parts | Type | Parts | (° C.) | Type | Parts | (° C.) |
|---|---|---|---|---|---|---|---|---|---|---|
| 1 | 1 | 1 | Titanium lactate | 1.30 | MTES | 2.20 | 50 | MTES | 5.00 | 50 |
| 2 | 2 | 1 | Titanium lactate | 0.80 | MTES | 1.80 | 70 | MTES | 3.50 | 70 |
| 3 | 3 | 1 | Titanium lactate | 2.10 | MTES | 2.30 | 50 | MTES | 4.30 | 50 |
| 4 | 4 | 1 | Titanium lactate | 1.30 | TEOS | 4.00 | 50 | TEOS | 5.50 | 50 |

TABLE 2-continued

| Toner No. | Toner particle No. | Toner base particle dispersion No. | Metal compound deposition step | | | | | Organosilicon compound addition step | | |
|---|---|---|---|---|---|---|---|---|---|---|
| | | | Metal source | | Organosilicon compound | | Reaction temperature | Organosilicon compound | | Reaction temperature |
| | | | Type | Parts | Type | Parts | (° C.) | Type | Parts | (° C.) |
| 5  | 5  | 1 | Titanium lactate         | 3.50  | VTES | 2.50 | 40 | VTES | 7.30  | 40 |
| 6  | 6  | 1 | Titanium lactate         | 5.60  | VTES | 2.60 | 35 | VTES | 10.60 | 35 |
| 7  | 7  | 1 | Titanium lactate         | 6.90  | VTES | 2.60 | 30 | VTES | 13.20 | 30 |
| 8  | 8  | 1 | Titanium lactate         | 1.20  | MTES | 1.70 | 50 | MTES | 4.50  | 50 |
| 9  | 9  | 1 | Titanium lactate         | 1.15  | MTES | 1.10 | 50 | MTES | 5.00  | 50 |
| 10 | 10 | 1 | Titanium lactate         | 1.00  | MTES | 0.65 | 50 | MTES | 4.80  | 50 |
| 11 | 11 | 1 | Titanium lactate         | 1.30  | MTES | 2.20 | 50 | MTES | 2.90  | 50 |
| 12 | 12 | 1 | Titanium lactate         | 1.30  | MTES | 2.20 | 50 | MTES | 2.20  | 50 |
| 13 | 13 | 1 | Titanium lactate         | 1.30  | MTES | 2.20 | 50 | MTES | 1.50  | 50 |
| 14 | 14 | 1 | Zirconium lactate        | 1.30  | MTES | 2.00 | 50 | MTES | 7.00  | 50 |
| 15 | 15 | 1 | Aluminum lactate         | 1.30  | MTES | 2.00 | 50 | MTES | 7.00  | 50 |
| 16 | 16 | 1 | Copper lactate           | 1.30  | MTES | 2.00 | 50 | MTES | 7.00  | 50 |
| 17 | 17 | 2 | Titanium lactate         | 1.30  | MTES | 2.00 | 50 | MTES | 5.00  | 50 |
| 18 | 18 | 3 | Titanium lactate         | 1.30  | MTES | 2.00 | 50 | MTES | 5.00  | 50 |
| 19 | 19 | 4 | Titanium lactate         | 1.30  | MTES | 2.00 | 50 | MTES | 5.00  | 50 |
| 20 | 20 | 3 | None                     | —     | —    | —    | —  | —    | —     | —  |
| 21 | 21 | 3 | Isopropyl triisostearoyl titanate | 5.00 | — | — | — | — | — | — |
| 22 | 22 | 3 | Tetraethoxy titanium     | 50.00 | MTES | 30   | —  | —    | —     | —  |
|    |    |   |                          |       | TEOS | 50   |    |      |       |    |
| 23 | 23 | 1 | None                     | —     | —    | —    | —  | MTES | 8.00  | 50 |

The abbreviations in Table 1 were used as the organosilicon compound names in Table 2. The amounts of the metal source and of the organosilicon compound indicate the amount of material itself that was charged.

compound was not fine particles. In the column of semispherical organosilicon polymer, Y indicates that the organosilicon polymer was semispherical, and N that the organosilicon polymer was not semispherical. In the column

TABLE 3

| Toner No. | Components contained in shell | | Presence of metal compound fine particles | Semispherical organosilicon polymer | Shell coverage ratio (%) | Shell fixing ratio (%) | | $H_a$ (nm) | $H_b$ (nm) | $H_a$ + 20.0 < $H_b$ | Volume resistivity of metal compound (Ω·cm) | E |
|---|---|---|---|---|---|---|---|---|---|---|---|---|
| | Metal compound | Organosilicon polymer | | | | $M_2/M_1$ | $S_{i2}/S_{i1}$ | | | | | |
| 1  | Y(Ti) | Y | Y | Y | 90.0 | 0.99 | 0.99 | 15.5  | 85.6  | Y | $9.0 \times 10^7$ | 1.54 |
| 2  | Y(Ti) | Y | Y | Y | 92.8 | 0.98 | 0.97 | 6.7   | 52.1  | Y | $9.0 \times 10^7$ | 1.54 |
| 3  | Y(Ti) | Y | Y | Y | 87.2 | 0.96 | 0.95 | 29.1  | 67.5  | Y | $9.0 \times 10^7$ | 1.54 |
| 4  | Y(Ti) | Y | Y | Y | 86.8 | 0.98 | 0.91 | 16.7  | 82.6  | Y | $9.0 \times 10^7$ | 1.54 |
| 5  | Y(Ti) | Y | Y | Y | 85.0 | 0.94 | 0.93 | 47.2  | 135.7 | Y | $9.0 \times 10^7$ | 1.54 |
| 6  | Y(Ti) | Y | Y | Y | 82.4 | 0.90 | 0.91 | 76.1  | 244.2 | Y | $9.0 \times 10^7$ | 1.54 |
| 7  | Y(Ti) | Y | Y | Y | 74.7 | 0.87 | 0.86 | 120.3 | 305.8 | Y | $9.0 \times 10^7$ | 1.54 |
| 8  | Y(Ti) | Y | Y | Y | 85.3 | 0.99 | 0.98 | 15.2  | 90.0  | Y | $9.0 \times 10^7$ | 1.54 |
| 9  | Y(Ti) | Y | Y | Y | 81.0 | 0.99 | 0.98 | 16.4  | 88.9  | Y | $9.0 \times 10^7$ | 1.54 |
| 10 | Y(Ti) | Y | Y | Y | 61.2 | 0.97 | 0.98 | 12.1  | 83.6  | Y | $9.0 \times 10^7$ | 1.54 |
| 11 | Y(Ti) | Y | Y | Y | 92.0 | 0.98 | 0.99 | 15.4  | 45.6  | Y | $9.0 \times 10^7$ | 1.54 |
| 12 | Y(Ti) | Y | Y | Y | 89.0 | 0.98 | 0.97 | 15.8  | 37.2  | Y | $9.0 \times 10^7$ | 1.54 |
| 13 | Y(Ti) | Y | Y | Y | 91.6 | 0.97 | 0.98 | 15.6  | 10.6  | N | $9.0 \times 10^7$ | 1.54 |
| 14 | Y(Zr) | Y | Y | Y | 91.0 | 0.98 | 0.99 | 17.2  | 80.0  | Y | $6.9 \times 10^7$ | 1.33 |
| 15 | Y(Al) | Y | Y | Y | 90.5 | 0.99 | 0.97 | 16.2  | 88.6  | Y | $4.7 \times 10^8$ | 1.61 |
| 16 | Y(Cu) | Y | Y | Y | 89.2 | 0.98 | 0.98 | 14.8  | 78.5  | Y | $2.9 \times 10^8$ | 1.90 |
| 17 | Y(Ti) | Y | Y | Y | 91.2 | 0.98 | 0.99 | 14.6  | 90.5  | Y | $9.0 \times 10^7$ | 1.54 |
| 18 | Y(Ti) | Y | Y | Y | 90.8 | 0.97 | 0.98 | 15.9  | 86.9  | Y | $9.0 \times 10^7$ | 1.54 |
| 19 | Y(Ti) | Y | Y | Y | 89.5 | 0.98 | 0.98 | 15.2  | 86.6  | Y | $9.0 \times 10^7$ | 1.54 |
| 20 | N     | N | N | N | —    | —    | —    | —     | —     | — | $2.0 \times 10^8$ | —    |
| 21 | Y(Ti) | N | N | N | 65.0 | 0.56 | —    | —     | —     | — | $2.0 \times 10^8$ | —    |
| 22 | Y(Ti) | Y | Y | N | 82.0 | 0.98 | 0.97 | 40.3  | 32.6  | N | $9.0 \times 10^7$ | —    |
| 23 | N     | Y | N | Y | 60.0 | —    | 0.92 | —     | 94.4  | — | —                 | —    |

In the table, "E" denotes "Electronegativity".

In the columns of the component contained in the shell, Y denotes the presence, and N the absence, of a metal compound or organosilicon polymer in the toner particle that was used. In the column of the presence of metal compound fine particles, Y indicates that the metal compound was in the form of fine particles, while N indicates that the metal $H_a+20.0<H_b$, Y indicates that the expression was satisfied, and N that the expression was not satisfied.

Examples 1 to 18, Comparative Examples 1 to 5

The above Toners 1 to 23 were evaluated as follows. Evaluation results are given in Table 4.

Evaluation methods and evaluation criteria are as follows.

A commercially available laser printer "LBP-9660Ci (by Canon Inc.), modified to have a process speed of 325 mm/sec, was used herein as the image forming apparatus. A commercially available toner cartridge (cyan) (by Canon Inc.), which is a process cartridge, was used herein.

The product toner inside the cartridge was removed, and the cartridge was cleaned by air blowing, after which 260 g of a respective toner for evaluation were filled into the cartridge. The product toner of each yellow, magenta and black station was removed; the yellow, magenta and black cartridges with disabled toner residual amount detection mechanism were then inserted, and evaluation was carried out.

(1) Evaluation of Charge Rising Performance

The above process cartridge, modified laser printer and evaluation paper (CS-068 (by Canon Inc.) A4: 68 g/m$^2$) were allowed to stand in a normal-temperature, normal-humidity environment (25° C./50% RH, hereafter N/N environment) for 48 hours.

In the N/N environment an image was outputted that had a transversal band-like all-black image portion (spread amount: 0.45 mg/cm$^2$) having a length of 10 mm from a position at 10 mm over to a position at 20 mm off the top of the evaluation paper, when the paper is viewed longitudinally, an all-white image portion (spread amount: 0.00 mg/cm$^2$) having a length of 10 mm downstream of the all-black image portion, and a halftone image portion (spread amount: 0.20 mg/cm$^2$) having a length of 100 mm, downstream of the all-white image portion.

The charge rising performance was evaluated, in accordance with the criteria below, on the basis of the difference between image density at a portion downstream, by one revolution of the developing roller, of the all-black image portion on the halftone image portion, and image density at a portion downstream, by one revolution of the developing roller, of the all-white image portion on the halftone image portion.

Image density was measured by measuring the relative density of the paper that was used with respect to a white background, portion using "Macbeth reflection densitometer (by X-Rite Inc.), according to the ancillary instruction manual, and the obtained relative density was taken as the value of image density.

Charge rising performance was then evaluated in accordance with the evaluation criteria below. Ratings C and above were deemed as good.

When charge rising performance is good, toner supplied to the charging roller is charged quickly, and good images are obtained, without changes in image density after the all-black image portion and after the all-white image portion Evaluation Criteria of Charge Rising Performance
A: image density difference smaller than 0.03
B: image density difference from 0.03 to less than 0.06
C: image density difference from 0.06 to less than 0.10
D: image density difference equal to or greater than 0.10

(2) Evaluation of Durability

After evaluation of charge rising performance, an image having a print ratio of 1.0% was continuously outputted in 35000 prints on the evaluation paper, in an N/N environment. After being allowed to stand to 24 hours in that environment, the same evaluation as that of the charge rising property was performed.

Durability was evaluated according to the above criteria of charge rising performance. The charging roller was visually observed, to check for the presence or absence of contamination by metal compound fine particles.

(3) Evaluation of Environmental Stability

The above process cartridge, modified laser printer and evaluation paper (HP brochure paper, 180 g glossy (by HP Development Company, L.P.) Letter: 180 g/m$^2$) were allowed to stand in a high-temperature/high-humidity environment (30° C./80% RH, hereafter H/H environment) for 48 hours.

Next, the process speed was modified to 108 mm/sec (⅓ speed), and an all-white image with 0% print ratio was outputted on evaluation paper, in the H/H environment.

Fogging density on the all-white image was measured and charging performance was evaluated in accordance with the criteria below. Ratings C and above were deemed as good.

Fogging density (%) was measured by being calculated on the basis of a difference between whiteness of a white background portion on a measured image, and the whiteness of the evaluation paper, using "Reflectometer Model TC-6DS" by Tokyo Denshoku Co., Ltd.). An amber filter was used as the filter.

Good images with little fogging can be obtained with a toner of superior charging performance.

A toner of superior environmental stability and low surface hygroscopicity exhibits good charging performance also in high-humidity environments. Toners with little fogging allow increasing the number of prints that can be printed by the toner cartridge, by curtailing toner consumption over prolonged use.

Evaluation Criteria of Environmental Stability
A: fogging density lower than 0.3%
B: fogging density from 0.3% to less than 0.8%
C: fogging density from 0.8% to less than 1.5%
D: fogging density of 1.5% or higher (4) Charging Stability (4-1) Sample Preparation Herein 1.0 g and 19.0 g of toner and a predetermined carrier (standard carrier of the Imaging Society of Japan: spherical carrier N-01 being a surface-treated ferrite core), respectively, were placed in plastic bottle with a lid, and were allowed to stand in a high-temperature/high-humidity environment (30° C., 80% RH) for 1 day.

(4-2) Measurement of Charge Quantity

The lid of the plastic bottle holding the above carrier and toner was closed, and the bottle was shaken for 1 minute at a speed of 4 back-and-forth shakes per second, using a shaker (YS-LD, by Yayoi KK), to charge a developer made up of the toner and the carrier. Next, a triboelectric charge quantity was measured using the device for measurement of triboelectric charge quantity illustrated in FIG. 2.

Figure 2:
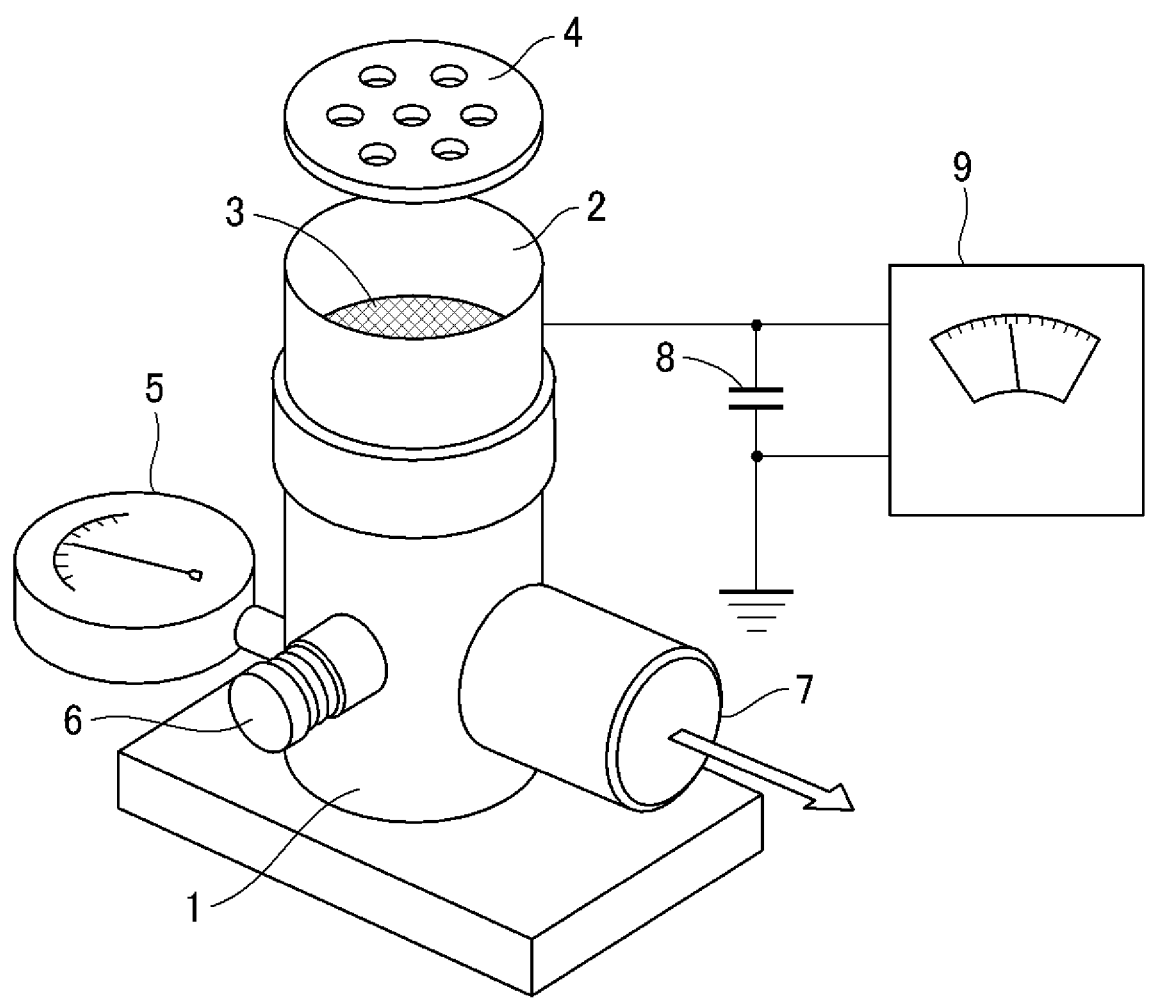
FIG. 2 is an example of a device for measuring a charge quantity of toner.

In FIG. 2, the above developer is placed, in an amount from 0.10 g to 0.15 g, in a metal-made measuring container 2 having a screen 3 with a mesh opening of 20 μm at the bottom, and a metal-made lid 4 was placed on the container 2. The mass of the entire measuring container 2 at this time is weighed exactly, as W1 (g).

Next, suction is performed in a suction device 1 (such that at least at the portion in contact with the measurement container 2 is an insulator), from a suction port 7, and an air quantity control valve 6 is adjusted, to set the pressure of a vacuum gauge 5 to 2.5 kPa. Suction is performed in this state for 2 minutes, to remove the toner by suction. The potential of an electrometer 9 is herein V (V). The reference symbol 8 is a capacitor having a capacity of C (mF). The mass of the entire measuring container 2 after suction is weighed exactly, as W2 (g). A triboelectric charge quantity Q (mC/kg) of a sample is then calculated in accordance with the expression below.

Triboelectric charge quantity Q (mC/kg)=C×V/(W1-W2)

Charging stability was evaluated with reference to an index of charging stability in the form of a retention rate (Q2/Q1) of charge quantity before and after the sample is allowed to stand, where Q1 (mC/kg) is the triboelectric charge quantity of the sample immediately after shaking and Q2 (mC/kg) is the above triboelectric charge quantity after having been allowed to stand for 1 day since shaking, in a high-temperature/high-humidity environment (30° C., 80% RH).

The evaluation criteria are as follows. Ratings C and above were deemed as good.

A: charging retention rate (Q2/Q1) from 0.90 to 1.00
B: charging retention rate (Q2/Q1) from 0.80 to less than 0.90
C: charging retention rate (Q2/Q1) from 0.70 to less than 0.80
D: charging retention rate (Q2/Q1) lower than 0.70

TABLE 4

|  | Toner No. | Charge rising value | rank | Durability Presence of value | rank | contamination | Environmental stability value | rank | Charging stability value | rank |
|---|---|---|---|---|---|---|---|---|---|---|
| Example 1 | 1 | 0.01 | A | 0.01 | A | No | 0.1 | A | 0.97 | A |
| Example 2 | 2 | 0.02 | A | 0.02 | A | No | 0.2 | A | 0.92 | A |
| Example 3 | 3 | 0.01 | A | 0.01 | A | No | 0.1 | A | 0.93 | A |
| Example 4 | 4 | 0.01 | A | 0.04 | B | No | 0.2 | A | 0.96 | A |
| Example 5 | 5 | 0.01 | A | 0.03 | B | No | 0.2 | A | 0.89 | B |
| Example 6 | 6 | 0.01 | A | 0.05 | B | No | 0.2 | A | 0.84 | B |
| Example 7 | 7 | 0.02 | A | 0.09 | C | No | 0.2 | A | 0.81 | B |
| Example 8 | 8 | 0.01 | A | 0.01 | A | No | 0.1 | A | 0.95 | A |
| Example 9 | 9 | 0.02 | A | 0.04 | B | No | 0.2 | A | 0.96 | A |
| Example 10 | 10 | 0.04 | B | 0.04 | B | No | 0.4 | B | 0.97 | A |
| Example 11 | 11 | 0.01 | A | 0.02 | A | No | 0.2 | A | 0.91 | A |
| Example 12 | 12 | 0.01 | A | 0.03 | B | No | 0.2 | A | 0.82 | B |
| Example 13 | 14 | 0.01 | A | 0.02 | A | No | 0.2 | A | 0.95 | A |
| Example 14 | 15 | 0.01 | A | 0.02 | A | No | 0.2 | A | 0.96 | A |
| Example 15 | 16 | 0.03 | B | 0.05 | B | No | 0.2 | A | 0.96 | A |
| Example 16 | 17 | 0.01 | A | 0.01 | A | No | 0.1 | A | 0.97 | A |
| Example 17 | 18 | 0.01 | A | 0.01 | A | No | 0.1 | A | 0.96 | A |
| Example 18 | 19 | 0.01 | A | 0.01 | A | No | 0.1 | A | 0.97 | A |
| Comparative example 1 | 20 | 0.01 | A | 0.15 | D | Yes | 1.4 | C | 0.86 | B |
| Comparative example 2 | 21 | 0.01 | A | 0.13 | D | Yes | 0.5 | B | 0.82 | B |
| Comparative example 3 | 22 | 0.01 | A | 0.10 | D | Yes | 0.3 | B | 0.73 | C |
| Comparative example 4 | 23 | 0.10 | D | 0.10 | D | Yes | 1.1 | C | 0.86 | B |
| Comparative example 5 | 13 | 0.01 | A | 0.10 | D | Yes | 0.3 | B | 0.74 | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-137209, filed Jul. 25, 2019, which is hereby incorporated by reference herein in its entirety.

What is claimed is:

1. A toner comprising a toner particle, wherein
the toner particle includes a toner base particle containing a binder resin, and a shell on a surface of the toner base particle;
the shell contains a metal compound and an organosilicon polymer;
the shell has at least an exposed portion of the metal compound and an exposed portion of the organosilicon polymer, on a surface of the toner particle; and
in a mapping analysis, by energy-dispersive X-ray spectroscopy EDX, of a cross section of the toner particle observed in a transmission electron microscope TEM, Ha (nm) being an average distance from an interface of the toner base particle and the shell up to the toner particle surface, at the exposed portion of the metal compound on the toner particle surface, and Hb (nm) being an average distance from the interface of the toner base particle and the shell up to the toner particle surface, at the exposed portion of the organosilicon polymer on the toner particle surface, satisfy Expression (1) below:

$$Hb > Ha + 20.0 \tag{1}$$

2. The toner according to claim 1, wherein
when the toner is subjected to a treatment (a) in which 1.0 g of the toner is dispersed in a mixed aqueous solution made up of 31.0 g of a 61.5 mass % aqueous solution of sucrose and 6.0 g of a 10.0 mass % aqueous solution of a neutral detergent for cleaning precision measuring instruments, made up of a nonionic surfactant, an anionic surfactant and an organic builder, and shaken for 20 minutes at 300 strokes per minute using a shaker, and
is subjected to a treatment (b) in which the toner subjected to the treatment (a) is dispersed in the mixed aqueous solution, and applied with ultrasound at an electrical output of 120 W for 10 minutes,
a coverage ratio of the shell in the toner after the treatment (b) is 80.0 area % or higher.

3. The toner according to claim 2, wherein
in an X-ray fluorescence analysis, when M1 (detected intensity kcps) denotes an amount of metal contained in the metal compound and Si1 (detected intensity kcps) denotes an amount of silicon contained in the organosilicon polymer, in the toner after execution of the treatment (a) and prior to execution of the treatment (b), and M2 (detected intensity kcps) denotes the amount of metal contained in the metal compound and Si2 (detected intensity kcps) denotes the amount of silicon contained in the organosilicon polymer, in the toner after execution of the treatment (b),
Expressions (2) and (3) below are satisfied:

$$M2/M1 \geq 0.90 \tag{2}$$

$$Si2/Si1 \geq 0.90 \tag{3}$$

4. The toner according to claim 1, wherein the average distance Ha (nm) and the average distance Hb (nm) satisfy Expressions (4) and (5):

$$2.5 \leq Ha \leq 50.0 \quad (4)$$

$$30.0 \leq Hb \leq 300.0 \quad (5).$$

5. The toner according to claim 1, wherein a volume resistivity of the metal compound is from $1.0 \times 10^5$ Ω·cm to $1.0 \times 10^{11}$ Ω·cm.

6. The toner according to claim 1, wherein the metal compound is a reaction product of a polyhydric acid and a compound containing at least one metal element M selected from the group consisting of metal elements included in group 3 to group 13.

7. The toner according to claim 6, wherein the metal element M has a Pauling electronegativity of from 1.25 to 1.85.

8. The toner according to claim 6, wherein the polyhydric acid contains at least one selected from the group consisting of carbonic acid, sulfuric acid and phosphoric acid.

9. The toner according to claim 6, wherein the metal element M is at least one selected from the group consisting of Zr, Ti and Al.

10. The toner according to claim 1, wherein the organosilicon polymer has a structure represented by Formula (I) below:

$$R\text{—}SiO_{3/2} \quad (I)$$

wherein in Formula (I), R represents an alkyl group, an alkenyl group, an acyl group, an aryl group or a methacryloxyalkyl group.

11. The toner according to claim 10, wherein R is an alkyl group having from 1 to 6 carbon atoms or vinyl group.

12. The toner according to claim 1, wherein the metal compound is in a form of fine particles; and the exposed portion of the organosilicon polymer is in a form of a semisphere having a cross section being an interface of the organosilicon polymer and the toner base particle.

* * * * *